(12) United States Patent
Röhrhoff et al.

(10) Patent No.: US 10,308,541 B2
(45) Date of Patent: Jun. 4, 2019

(54) GLASS FORMING MACHINE PARTICLE FILTER, A PLUNGER UNIT, A BLOW HEAD, A BLOW HEAD SUPPORT AND A GLASS FORMING MACHINE ADAPTED TO OR COMPRISING SAID FILTER

(71) Applicant: Gerresheimer Glas GmbH, Düsseldorf (DE)

(72) Inventors: Uwe Röhrhoff, Mönchengladbach (DE); Bruno Bürkel, Lohr am Main (DE); Thomas Maiberger, Frankfort, IL (US)

(73) Assignee: GERRESHEIMER GLAS GMBH, Düsseldorf (DE)

( * ) Notice: Subject to any disclaimer, the term of this patent is extended or adjusted under 35 U.S.C. 154(b) by 0 days.

(21) Appl. No.: 15/526,214

(22) PCT Filed: Feb. 6, 2015

(86) PCT No.: PCT/EP2015/000244
§ 371 (c)(1),
(2) Date: May 11, 2017

(87) PCT Pub. No.: WO2016/074750
PCT Pub. Date: May 19, 2016

(65) Prior Publication Data
US 2017/0313614 A1 Nov. 2, 2017

Related U.S. Application Data

(60) Provisional application No. 62/079,208, filed on Nov. 13, 2014.

(51) Int. Cl.
*C03B 9/30* (2006.01)
*C03B 9/36* (2006.01)
(Continued)

(52) U.S. Cl.
CPC .......... *C03B 9/165* (2013.01); *B01D 46/0026* (2013.01); *B01D 46/10* (2013.01);
(Continued)

(58) Field of Classification Search
CPC ....................................................... C03B 9/00
See application file for complete search history.

(56) References Cited

U.S. PATENT DOCUMENTS

| | | | |
|---|---|---|---|
| 2,752,731 A | 7/1956 | Altosaar | |
| 3,615,958 A | 10/1971 | Cohen | |

(Continued)

FOREIGN PATENT DOCUMENTS

| | | | |
|---|---|---|---|
| CA | 1084711 A | 9/1980 | |
| CA | 2137800 A1 | 5/1993 | |

(Continued)

OTHER PUBLICATIONS

Hahnemann, H.W. "The pressure drop for perforated plates with extremely small free opening and extremely small opening diameter" Forsch. Ing.Wes. 42 (1976) No. 3 and its English Translation.
(Continued)

*Primary Examiner* — Cynthia Szewczyk
(74) *Attorney, Agent, or Firm* — McCormick, Paulding & Huber LLP

(57) ABSTRACT

The present invention relates to a particle filter (F) for a glass forming machine operating according to a blow-and-blow process or according to a press-and-blow process, said particle filter (F) is adapted for placing in at least an air channel (14a) serving pressurized air for counter blow (5) of a parison (P) in a blank mold (2) forming station of said glass forming machine, and/or an air channel (14b, 20) serving pressurized air for final blow (11) and/or for finish cooling (21) of a glass container (12) made of said parison (P) in a finish mold (8) station of said glass forming machine, said particle filter (F) comprising a surface filter as a main filter media (MF) and said particle filter (F), if placed in at least said air channel (14a) serving pressurized air for counter blow (5) of said parison (P) in said blank mold (2) forming station of said glass forming machine, and/or said air chan-
(Continued)

nel (14*b*, 20) serving pressurized air for final blow (11) and/or for finish cooling (21) of said glass container made of said parison (P) in said finish mold (8) station of said glass forming machine, avoiding passage of particles above a certain size from a dirty side of said main filter media (MF) to a clean side of said main filter media (MF) and thus, also avoiding final passage of said particles above said certain size into said parison (P) or said glass container (12) blown by said glass forming machine and a plunger unit (PU), a blow head (BH), a blow head support and a glass forming machine adapted for a particle filter (F) according to the present invention.

62 Claims, 33 Drawing Sheets

(51) Int. Cl.
   *C03B 9/16* (2006.01)
   *B01D 46/10* (2006.01)
   *C03B 9/193* (2006.01)
   *C03B 9/38* (2006.01)
   *C03B 9/40* (2006.01)
   *B01D 46/00* (2006.01)

(52) U.S. Cl.
   CPC ............ *C03B 9/193* (2013.01); *C03B 9/1932* (2013.01); *C03B 9/36* (2013.01); *C03B 9/3627* (2013.01); *C03B 9/3645* (2013.01); *C03B 9/3654* (2013.01); *C03B 9/3663* (2013.01); *C03B 9/38* (2013.01); *C03B 9/3816* (2013.01); *C03B 9/3825* (2013.01); *C03B 9/3833* (2013.01); *C03B 9/3841* (2013.01); *C03B 9/403* (2013.01); *B01D 46/002* (2013.01); *B01D 2275/10* (2013.01); *B01D 2279/00* (2013.01)

(56) References Cited

U.S. PATENT DOCUMENTS

| | | |
|---|---|---|
| 3,630,700 A | 12/1971 | Hammel |
| 3,632,414 A | 1/1972 | Dayton et al. |
| 3,645,711 A | 2/1972 | Pirooz |
| 3,645,777 A | 2/1972 | Sierad |
| 3,646,908 A | 3/1972 | Bowen et al. |
| 3,647,490 A | 3/1972 | Pirooz |
| 3,650,721 A | 3/1972 | Hammel et al. |
| 3,652,318 A | 3/1972 | Heins |
| 3,714,055 A | 1/1973 | Matsuura et al. |
| 3,734,802 A | 5/1973 | Cohen |
| 3,785,722 A | 1/1974 | Schultz |
| 3,808,035 A | 4/1974 | Stelter |
| 3,817,211 A | 6/1974 | Brown et al. |
| 3,833,387 A | 9/1974 | Reed et al. |
| 3,863,177 A | 1/1975 | Damen et al. |
| 3,865,540 A | 2/1975 | Loeffler |
| 3,919,437 A | 11/1975 | Brown et al. |
| 3,923,487 A | 12/1975 | Lewis |
| 3,923,533 A | 12/1975 | Hammel et al. |
| 3,923,688 A | 12/1975 | Hammel et al. |
| 3,929,440 A | 12/1975 | Oldfield |
| 3,951,547 A | 4/1976 | Fujinami et al. |
| 3,955,953 A | 5/1976 | Hauser |
| 3,972,720 A | 8/1976 | Hammel et al. |
| 3,972,721 A | 8/1976 | Hammel et al. |
| 4,021,217 A | 5/1977 | Bondybey et al. |
| 4,022,602 A | 5/1977 | Pavlopoulos |
| 4,022,628 A | 5/1977 | Deeg |
| 4,026,420 A | 5/1977 | Cuniberti |
| 4,065,283 A | 12/1977 | Asahara et al. |
| 4,065,317 A | 12/1977 | Baak et al. |
| 4,093,771 A | 6/1978 | Goldstein et al. |
| 4,095,986 A | 6/1978 | Matsuda et al. |
| 4,099,883 A | 7/1978 | Berger et al. |
| 4,105,577 A | 8/1978 | Yamashita |
| 4,106,857 A | 8/1978 | Snitzer |
| 4,106,946 A | 8/1978 | Ritze |
| 4,110,245 A | 8/1978 | Yamashita |
| 4,162,910 A * | 7/1979 | Lining .................... C03B 9/406 65/161 |
| 4,168,959 A | 9/1979 | Loeffler |
| 4,196,837 A | 4/1980 | Burkart et al. |
| 4,214,972 A | 7/1980 | Shintock |
| 4,247,034 A | 1/1981 | Burkart et al. |
| 4,261,720 A | 4/1981 | Helbing |
| 4,268,294 A | 5/1981 | Laughlin et al. |
| 4,288,250 A | 9/1981 | Yamashita |
| 4,293,004 A | 10/1981 | Lowe |
| 4,297,142 A | 10/1981 | Ritze |
| 4,303,298 A | 12/1981 | Yamashita |
| 4,305,982 A | 12/1981 | Hirsch |
| 4,323,381 A | 4/1982 | Matsuyama et al. |
| 4,324,576 A | 4/1982 | Matsuyama et al. |
| 4,347,326 A | 8/1982 | Iwami et al. |
| 4,363,647 A | 12/1982 | Bachman et al. |
| 4,382,451 A | 5/1983 | Lowe |
| 4,390,357 A | 6/1983 | Myers et al. |
| 4,407,669 A | 10/1983 | Nelson |
| 4,431,692 A | 2/1984 | Hofmann et al. |
| 4,439,270 A | 3/1984 | Powell |
| 4,445,919 A | 5/1984 | Cole et al. |
| 4,493,722 A | 1/1985 | Ono |
| 4,495,223 A | 1/1985 | Lalancette et al. |
| 4,516,934 A | 5/1985 | Nelson et al. |
| 4,519,827 A | 5/1985 | Jones |
| 4,521,524 A | 6/1985 | Yamashita |
| 4,524,000 A | 6/1985 | Clayfield et al. |
| 4,528,012 A | 7/1985 | Sturgill |
| 4,552,578 A | 11/1985 | Anderson |
| 4,586,980 A | 5/1986 | Hirai et al. |
| 4,588,540 A | 5/1986 | Kiefer et al. |
| 4,604,119 A | 8/1986 | Kuhl et al. |
| 4,615,916 A | 10/1986 | Henderson |
| 4,626,071 A | 12/1986 | Wada et al. |
| 4,657,048 A | 4/1987 | Foster |
| 4,741,962 A | 5/1988 | Wada et al. |
| 4,741,963 A | 5/1988 | Wada et al. |
| 4,769,347 A | 9/1988 | Cook et al. |
| 4,822,392 A | 4/1989 | Fachat et al. |
| 4,828,597 A | 5/1989 | Glascock, II et al. |
| 4,842,620 A | 6/1989 | Hammel et al. |
| 4,853,001 A | 8/1989 | Hammel |
| 4,853,017 A | 8/1989 | Eberle et al. |
| 4,871,695 A | 10/1989 | Seki et al. |
| 4,894,303 A | 1/1990 | Wu |
| 4,921,519 A | 5/1990 | Schinker et al. |
| 4,927,442 A | 5/1990 | Greulich et al. |
| 4,935,094 A | 6/1990 | Mixon et al. |
| 4,999,071 A | 3/1991 | Nakamura et al. |
| 5,007,948 A | 4/1991 | Araujo |
| 5,024,974 A | 6/1991 | Nakamura et al. |
| 5,028,251 A | 7/1991 | Schinker et al. |
| 5,034,044 A | 7/1991 | Glascock, II |
| 5,036,025 A | 7/1991 | Lin |
| 5,040,880 A | 8/1991 | Morimoto et al. |
| 5,061,659 A | 10/1991 | Ciolek et al. |
| 5,078,771 A | 1/1992 | Wu |
| 5,081,953 A | 1/1992 | Guthrie et al. |
| 5,087,323 A | 2/1992 | Park |
| 5,118,371 A | 6/1992 | Hori et al. |
| 5,120,341 A | 6/1992 | Nozawa et al. |
| 5,126,006 A | 6/1992 | Cronin et al. |
| 5,133,791 A | 7/1992 | Yagami et al. |
| 5,133,795 A | 7/1992 | Glascock, II |
| 5,145,805 A | 9/1992 | Tarumi et al. |
| 5,211,734 A | 5/1993 | Yagami et al. |
| 5,234,594 A | 8/1993 | Tonucci et al. |
| 5,249,076 A | 9/1993 | Fujiwara et al. |
| 5,234,871 A | 10/1993 | Krashkevich |
| 5,253,258 A | 10/1993 | Lawandy |

(56) References Cited

U.S. PATENT DOCUMENTS

| | | |
|---|---|---|
| 5,285,517 A | 2/1994 | Wu |
| 5,324,691 A | 6/1994 | Tarumi et al. |
| 5,383,038 A | 1/1995 | Lawandy |
| 5,383,946 A | 1/1995 | Naka et al. |
| 5,396,080 A | 3/1995 | Hannotiau et al. |
| 5,430,236 A | 7/1995 | de Macedo et al. |
| 5,437,702 A * | 8/1995 | Burns .................. B07C 5/3408 209/525 |
| 5,464,566 A | 11/1995 | Ito et al. |
| 5,468,344 A | 11/1995 | Inoue et al. |
| 5,476,990 A | 12/1995 | Hittner et al. |
| 5,481,630 A | 1/1996 | Lawandy |
| 5,520,855 A | 5/1996 | Ito et al. |
| 5,524,011 A | 6/1996 | Lawandy |
| 5,552,467 A | 9/1996 | Reiter et al. |
| 5,562,951 A | 10/1996 | Kamen |
| 5,597,614 A | 1/1997 | Noguchi et al. |
| 5,614,255 A | 3/1997 | Kimura et al. |
| 5,616,296 A | 4/1997 | Hittner et al. |
| 5,616,532 A | 4/1997 | Heller et al. |
| 5,639,517 A | 6/1997 | Floch et al. |
| 5,662,050 A | 9/1997 | Angelo, II et al. |
| 5,665,422 A | 9/1997 | Endo et al. |
| 5,667,888 A | 9/1997 | Yoshida et al. |
| 5,679,466 A | 10/1997 | Noguchi et al. |
| 5,707,685 A | 1/1998 | Endou et al. |
| 5,711,018 A | 1/1998 | Hittner et al. |
| 5,717,051 A | 2/1998 | Hiraoka et al. |
| 5,742,118 A | 4/1998 | Endo et al. |
| 5,750,448 A | 5/1998 | Grabowski et al. |
| 5,792,711 A | 8/1998 | Roberts |
| 5,849,200 A | 12/1998 | Heller et al. |
| 5,851,251 A | 12/1998 | Kondo et al. |
| 5,854,169 A | 12/1998 | Heller et al. |
| 5,858,541 A | 1/1999 | Hiraoka et al. |
| 5,876,475 A | 3/1999 | Kozora |
| 5,908,561 A | 6/1999 | Palm et al. |
| 5,922,138 A | 7/1999 | Shindo et al. |
| 5,928,527 A | 7/1999 | Li et al. |
| 5,942,793 A | 8/1999 | Senoo et al. |
| 5,990,060 A | 11/1999 | Ohmi et al. |
| 6,020,028 A | 2/2000 | Kinneberg |
| 6,036,735 A | 3/2000 | Carter et al. |
| 6,074,981 A | 6/2000 | Tada et al. |
| 6,093,484 A | 7/2000 | Oguma |
| 6,093,676 A | 7/2000 | Heller et al. |
| 6,109,278 A | 8/2000 | Shindo et al. |
| 6,110,528 A | 8/2000 | Kimura et al. |
| 6,111,227 A | 8/2000 | Cress |
| 6,119,483 A | 9/2000 | Takahashi et al. |
| 6,129,899 A | 10/2000 | Katsuro et al. |
| 6,168,835 B1 | 1/2001 | Carter et al. |
| 6,171,652 B1 | 1/2001 | Singh et al. |
| 6,176,702 B1 | 1/2001 | Mohr et al. |
| 6,187,099 B1 | 2/2001 | Blaudszun |
| 6,192,715 B1 | 2/2001 | Orita et al. |
| 6,194,346 B1 | 2/2001 | Tada et al. |
| 6,206,191 B1 | 3/2001 | Singh et al. |
| 6,211,424 B1 | 4/2001 | Powell et al. |
| 6,211,526 B1 | 4/2001 | Huston et al. |
| 6,214,249 B1 | 4/2001 | Li et al. |
| 6,221,268 B1 | 4/2001 | Li et al. |
| 6,233,974 B1 | 5/2001 | Anderson et al. |
| 6,235,667 B1 | 5/2001 | Paloschi et al. |
| 6,284,314 B1 | 9/2001 | Kato et al. |
| 6,287,683 B1 | 9/2001 | Itoh et al. |
| 6,289,694 B1 | 9/2001 | Pieper |
| 6,301,936 B1 | 10/2001 | Ohga et al. |
| 6,307,212 B1 | 10/2001 | Huston et al. |
| 6,312,317 B1 | 11/2001 | Oguma |
| 6,319,331 B1 | 11/2001 | Kume et al. |
| 6,323,585 B1 | 11/2001 | Crane et al. |
| 6,339,940 B1 | 1/2002 | Yamada et al. |
| 6,342,460 B1 | 1/2002 | Akimoto et al. |
| 6,358,873 B1 | 3/2002 | Stewart |
| 6,387,844 B1 | 5/2002 | Fujishima et al. |
| 6,392,683 B1 | 5/2002 | Hayashi |
| 6,417,879 B2 | 7/2002 | Hayashi |
| 6,427,489 B1 | 8/2002 | Eda et al. |
| 6,430,965 B2 | 8/2002 | Eda et al. |
| 6,468,403 B1 | 10/2002 | Shimizu et al. |
| 6,501,499 B2 | 12/2002 | Hayashi |
| 6,525,315 B1 | 2/2003 | Motoyama |
| 6,527,547 B2 | 3/2003 | De Bruin et al. |
| 6,563,126 B1 | 5/2003 | Motoyama |
| 6,584,805 B1 | 7/2003 | Burns et al. |
| 6,587,136 B2 | 7/2003 | Hayashi |
| 6,641,663 B2 | 11/2003 | Kemmochi et al. |
| 6,656,321 B2 | 12/2003 | Furukawa |
| 6,677,260 B2 | 1/2004 | Crane et al. |
| 6,696,228 B2 | 2/2004 | Muraoka et al. |
| 6,698,249 B1 | 3/2004 | Yagi et al. |
| 6,709,518 B2 | 3/2004 | Kojima et al. |
| 6,716,779 B2 | 4/2004 | Lin |
| 6,733,827 B2 | 5/2004 | Mitchell et al. |
| 6,748,769 B2 | 6/2004 | Ooishi et al. |
| 6,780,516 B2 | 8/2004 | Chen |
| 6,783,845 B2 | 8/2004 | Zhang et al. |
| 6,789,401 B1 | 9/2004 | Dabby et al. |
| 6,793,769 B2 | 9/2004 | Kajino et al. |
| 6,796,144 B2 | 9/2004 | Shepard et al. |
| 6,828,719 B1 | 12/2004 | Huang et al. |
| 6,844,976 B1 | 1/2005 | Firon et al. |
| 6,849,242 B1 | 2/2005 | Koeppler et al. |
| 6,881,445 B1 | 4/2005 | Arora |
| 6,903,036 B2 | 6/2005 | Akimoto et al. |
| 6,913,643 B2 | 7/2005 | Dejaiffe |
| 6,936,306 B1 | 8/2005 | Barron et al. |
| 6,939,611 B2 | 9/2005 | Fujishima et al. |
| 6,942,288 B2 | 9/2005 | Paetz et al. |
| 7,040,960 B2 | 5/2006 | Hench et al. |
| 7,127,918 B2 | 10/2006 | Vitkala et al. |
| 7,143,612 B2 | 12/2006 | Ishihara |
| 7,144,633 B2 | 12/2006 | Zguris et al. |
| 7,157,840 B2 | 1/2007 | Fujishima et al. |
| 7,171,973 B2 | 2/2007 | Orii et al. |
| 7,175,833 B1 | 2/2007 | Algar |
| 7,186,441 B2 | 3/2007 | Mitchell et al. |
| 7,189,783 B2 | 3/2007 | Kozawa et al. |
| 7,327,074 B2 | 2/2008 | Fujishima et al. |
| 7,373,791 B1 | 5/2008 | Leehr |
| 7,404,407 B2 | 7/2008 | Orii et al. |
| 7,441,417 B2 | 10/2008 | Park et al. |
| 7,451,623 B2 | 11/2008 | Dabby et al. |
| 7,451,624 B2 | 11/2008 | Dabby et al. |
| 7,507,618 B2 | 3/2009 | Dunbar |
| 7,538,051 B2 | 5/2009 | Fujiwara et al. |
| 7,670,974 B2 | 3/2010 | Fujiwara et al. |
| 7,726,153 B2 | 6/2010 | Ooishi et al. |
| 7,891,066 B2 | 2/2011 | Aoki et al. |
| 8,042,359 B2 | 10/2011 | Coppola et al. |
| 8,047,023 B2 | 11/2011 | Ackerman et al. |
| 8,079,234 B2 | 12/2011 | Yoshida |
| 8,123,970 B2 | 2/2012 | Durante et al. |
| 8,281,620 B1 | 10/2012 | Sudo et al. |
| 8,298,369 B2 | 10/2012 | Maeda et al. |
| 8,420,191 B2 | 4/2013 | Yamagata et al. |
| 8,420,192 B2 | 4/2013 | Yamagata et al. |
| 8,460,769 B2 | 6/2013 | Yamagata et al. |
| 8,476,353 B2 | 7/2013 | Higashiyama et al. |
| 8,635,888 B2 | 1/2014 | Dabby et al. |
| 8,641,829 B2 | 2/2014 | Horita et al. |
| 8,728,338 B2 | 5/2014 | Ohmi et al. |
| 8,733,127 B2 | 5/2014 | Yamagata et al. |
| 2001/0003299 A1 | 6/2001 | Furukawa |
| 2001/0028385 A1 | 10/2001 | Hayashi |
| 2001/0028386 A1 | 10/2001 | Hayashi |
| 2001/0028390 A1 | 10/2001 | Hayashi |
| 2001/0037662 A1 | 11/2001 | Kohmura et al. |
| 2001/0039810 A1 | 11/2001 | Eda et al. |
| 2001/0040136 A1 | 11/2001 | Wei et al. |
| 2001/0044370 A1 | 11/2001 | Crane et al. |
| 2002/0000192 A1 | 1/2002 | Kojima et al. |
| 2002/0006594 A1 | 1/2002 | De Bruin et al. |

(56) References Cited

U.S. PATENT DOCUMENTS

| | | |
|---|---|---|
| 2002/0062666 A1 | 5/2002 | Ooishi et al. |
| 2002/0072461 A1 | 6/2002 | Akimoto et al. |
| 2002/0077243 A1 | 6/2002 | Sircar |
| 2002/0107144 A1 | 8/2002 | Fujishima et al. |
| 2002/0115781 A1 | 8/2002 | Pourreau et al. |
| 2002/0150686 A1 | 10/2002 | Mitchell et al. |
| 2002/0157421 A1 | 10/2002 | Ackerman et al. |
| 2002/0178757 A1 | 12/2002 | Chinn |
| 2003/0003228 A1 | 1/2003 | Ooishi et al. |
| 2003/0010671 A1 | 1/2003 | Orii et al. |
| 2003/0012899 A1 | 1/2003 | Kemmochi et al. |
| 2003/0015004 A1 | 1/2003 | Nakamura et al. |
| 2003/0024269 A1 | 2/2003 | Shepard et al. |
| 2003/0050173 A1 | 3/2003 | Lin |
| 2003/0061834 A1 | 4/2003 | Vitkala et al. |
| 2003/0075694 A1 | 4/2003 | Motoyama |
| 2003/0076487 A1 | 4/2003 | Cannon et al. |
| 2003/0079835 A1 | 5/2003 | Kajino et al. |
| 2003/0096701 A1 | 5/2003 | Fujishima et al. |
| 2003/0101770 A1 | 6/2003 | Nakamura et al. |
| 2003/0106491 A1 | 6/2003 | Kemmochi et al. |
| 2003/0125187 A1 | 7/2003 | Akimoto et al. |
| 2003/0126890 A1 | 7/2003 | Orita et al. |
| 2003/0136511 A1 | 7/2003 | Balasubramhanya et al. |
| 2003/0148113 A1 | 8/2003 | Chen |
| 2003/0152763 A1 | 8/2003 | Zhang et al. |
| 2003/0157801 A1 | 8/2003 | Kozawa et al. |
| 2003/0196986 A1 | 10/2003 | Tsung-Kuei et al. |
| 2003/0198660 A1 | 10/2003 | Janas et al. |
| 2003/0225188 A1 | 12/2003 | Horie |
| 2004/0006158 A1 | 1/2004 | Horie et al. |
| 2004/0006159 A1 | 1/2004 | Horie et al. |
| 2004/0040497 A1 | 3/2004 | Kemmochi et al. |
| 2004/0055339 A1 | 3/2004 | Ishihara |
| 2004/0060326 A1 | 4/2004 | Ishihara |
| 2004/0063811 A1 | 4/2004 | Horie et al. |
| 2004/0134236 A1 | 7/2004 | Ishihara |
| 2004/0137827 A1 | 7/2004 | Hench et al. |
| 2004/0162210 A1 | 8/2004 | Dejaiffe |
| 2004/0172977 A1 | 9/2004 | Nakamura et al. |
| 2004/0176499 A1 | 9/2004 | Herrmann et al. |
| 2004/0183342 A1 | 9/2004 | Paetz et al. |
| 2004/0206120 A1 | 10/2004 | Yamamura |
| 2004/0219293 A1 | 11/2004 | Mitchell et al. |
| 2004/0232819 A1 | 11/2004 | Huang et al. |
| 2004/0244426 A1 | 12/2004 | Park et al. |
| 2004/0247892 A1 | 12/2004 | Chen |
| 2004/0251810 A1 | 12/2004 | Hsu |
| 2004/0254265 A1 | 12/2004 | Mizutani et al. |
| 2004/0259714 A1 | 12/2004 | Fujiwara et al. |
| 2005/0000251 A1 | 1/2005 | Dabby et al. |
| 2005/0032932 A1 | 2/2005 | Salenbien |
| 2005/0095404 A1 | 5/2005 | Schillert et al. |
| 2005/0109066 A1 | 5/2005 | Dabby et al. |
| 2005/0143250 A1 | 6/2005 | Fujiwara et al. |
| 2005/0148454 A1 | 7/2005 | Hachitani |
| 2005/0148688 A1 | 7/2005 | Mizutani et al. |
| 2005/0148689 A1 | 7/2005 | Mizutani et al. |
| 2005/0166495 A1 | 8/2005 | Cho et al. |
| 2005/0171236 A1 | 8/2005 | Johnke et al. |
| 2005/0186412 A1 | 8/2005 | Arora |
| 2005/0192380 A1 | 9/2005 | Horie et al. |
| 2005/0199014 A1 | 9/2005 | Nakamura et al. |
| 2005/0239918 A1 | 10/2005 | Nakazawa et al. |
| 2005/0268408 A1 | 12/2005 | Chin |
| 2006/0005579 A1 | 1/2006 | Jacobsen et al. |
| 2006/0086147 A1 | 4/2006 | Ooishi et al. |
| 2006/0099328 A1 | 5/2006 | Waite et al. |
| 2006/0189713 A1 | 8/2006 | Herrmann et al. |
| 2006/0196527 A1 | 9/2006 | Nishimura et al. |
| 2006/0225999 A1 | 10/2006 | Fukawa et al. |
| 2006/0238100 A1 | 10/2006 | Miyata et al. |
| 2007/0032571 A1 | 2/2007 | Furuno et al. |
| 2007/0054981 A1 | 3/2007 | Yanagi et al. |
| 2007/0009579 A1 | 5/2007 | Shinozaki et al. |
| 2007/0095791 A1 | 5/2007 | Shinozaki et al. |
| 2007/0099787 A1 | 5/2007 | Hayden et al. |
| 2007/0105379 A1 | 5/2007 | Orii et al. |
| 2007/0105380 A1 | 5/2007 | Orii et al. |
| 2007/0157676 A1 | 7/2007 | Taquet et al. |
| 2007/0221615 A1 | 9/2007 | Maeda et al. |
| 2007/0221617 A1 | 9/2007 | Takahashi |
| 2007/0230181 A1 | 10/2007 | Fujishima et al. |
| 2007/0271756 A1 | 11/2007 | Aoki et al. |
| 2007/0271957 A1 | 11/2007 | Nakamura et al. |
| 2008/0011713 A1 | 1/2008 | Ito |
| 2008/0017502 A1 | 1/2008 | Fukawa et al. |
| 2008/0148781 A1 | 6/2008 | Yoshida |
| 2009/0038346 A1 | 2/2009 | Dabby et al. |
| 2009/0038543 A1 | 2/2009 | Dabby et al. |
| 2010/0212364 A1 | 8/2010 | Suzuki et al. |
| 2011/0023543 A1 | 2/2011 | Umetsu et al. |
| 2011/0079047 A1 | 4/2011 | Suzuki et al. |
| 2011/0090933 A1 | 4/2011 | Gibbs et al. |
| 2011/0143063 A1 | 6/2011 | Yamagata et al. |
| 2011/0177290 A1 | 7/2011 | Tomamoto et al. |
| 2011/0177325 A1 | 7/2011 | Tomamoto et al. |
| 2011/0192758 A1 | 8/2011 | Yamagata et al. |
| 2011/0200812 A1 | 8/2011 | Tomamoto et al. |
| 2011/0240663 A1 | 10/2011 | Yamagata et al. |
| 2011/0251293 A1 | 10/2011 | Trummer et al. |
| 2011/0255161 A1 | 10/2011 | Yoneda |
| 2011/0256330 A1 | 10/2011 | Yamagata et al. |
| 2012/0024012 A1 | 2/2012 | Yamada |
| 2012/0056106 A1 | 3/2012 | Neumann |
| 2012/0073329 A1 | 3/2012 | Fernald et al. |
| 2012/0118018 A1 | 5/2012 | Orita et al. |
| 2012/0165178 A1 | 6/2012 | Ritter et al. |
| 2012/0182614 A1 | 7/2012 | Yoneda |
| 2012/0198889 A1 | 8/2012 | Nakamura et al. |
| 2012/0207995 A1 | 8/2012 | Shelestak et al. |
| 2012/0264872 A1 | 10/2012 | Weiss et al. |
| 2012/0266634 A1 | 10/2012 | Folk et al. |
| 2012/0272682 A1 | 11/2012 | Sudo et al. |
| 2013/0227990 A1 | 9/2013 | Yamagata et al. |
| 2013/0227991 A1 | 9/2013 | Yamagata et al. |
| 2014/0150715 A1 | 6/2014 | Yamagata |
| 2016/0052817 A1* | 2/2016 | Ueda .................... C03B 9/1936 65/162 |

FOREIGN PATENT DOCUMENTS

| | | |
|---|---|---|
| CA | 2137800 C | 6/1993 |
| CA | 2137800 C | 1/2003 |
| CA | 2483339 A1 | 10/2004 |
| CN | 1127226 A | 7/1996 |
| CN | 1899995 A | 1/2007 |
| CN | 2007078876 A1 | 7/2007 |
| CN | 101016188 A | 8/2007 |
| CN | 101041556 A | 9/2007 |
| CN | 101048488 A | 10/2007 |
| CN | 101186424 A | 5/2008 |
| CN | 201334433 Y | 10/2009 |
| CN | 101659521 A | 3/2010 |
| CN | 201746462 U | 2/2011 |
| CN | 101016188 B | 6/2011 |
| CN | 102378925 A | 3/2012 |
| CN | 102408192 A | 4/2012 |
| CN | 102417294 A | 4/2012 |
| CN | 202181248 U | 4/2012 |
| CN | 101186424 B | 5/2012 |
| CN | 102618170 A | 8/2012 |
| CN | 102795782 A | 11/2012 |
| CN | 103058502 A | 4/2013 |
| CN | 202849253 U | 4/2013 |
| CN | 101659521 B | 7/2013 |
| CN | 102795782 B2 | 6/2014 |
| DE | 32 33 211 A1 | 3/1983 |
| DE | 691 03 444 T2 | 11/1994 |
| DE | 691 22 586 T2 | 2/1997 |
| DE | 19532800 A1 | 2/1997 |
| DE | 698 12 251 T2 | 11/2003 |
| DE | 4392738 B4 | 6/2006 |
| DE | 202021012718 U1 | 9/2013 |

(56) References Cited

FOREIGN PATENT DOCUMENTS

| | | |
|---|---|---|
| EP | 0137927 B1 | 4/1985 |
| EP | 0148238 B1 | 7/1985 |
| EP | 0166370 B1 | 1/1986 |
| EP | 0166371 B1 | 1/1986 |
| EP | 0265051 A1 | 4/1986 |
| EP | 0399577 A1 | 11/1990 |
| EP | 0422557 A2 | 4/1991 |
| EP | 0 444 793 A1 | 9/1991 |
| EP | 0447678 A1 | 9/1991 |
| EP | 0452922 A1 | 10/1991 |
| EP | 0456351 A3 | 11/1991 |
| EP | 0470449 A1 | 2/1992 |
| EP | 0 476 218 A1 | 3/1992 |
| EP | 0504926 A1 | 9/1992 |
| EP | 0547576 A2 | 6/1993 |
| EP | 0598472 A1 | 8/1993 |
| EP | 0579388 A1 | 1/1994 |
| EP | 0636702 A1 | 2/1995 |
| EP | 0504926 B1 | 6/1995 |
| EP | 0454666 B1 | 11/1995 |
| EP | 0270666 B1 | 8/1996 |
| EP | 0464079 B1 | 10/1996 |
| EP | 0452922 B1 | 1/1997 |
| EP | 0547576 B1 | 3/1997 |
| EP | 0598472 B1 | 6/1997 |
| EP | 0823403 A1 | 2/1998 |
| EP | 0579388 B1 | 4/1998 |
| EP | 0854022 A1 | 7/1998 |
| EP | 0 870 530 A1 | 10/1998 |
| EP | 0870530 A1 | 10/1998 |
| EP | 0871046 A1 | 10/1998 |
| EP | 0 897 896 A2 | 2/1999 |
| EP | 0874786 B1 | 3/1999 |
| EP | 0905273 A3 | 4/1999 |
| EP | 0636702 B1 | 5/1999 |
| EP | 0799802 B1 | 1/2000 |
| EP | 0963797 A3 | 3/2000 |
| EP | 0999574 A1 | 5/2000 |
| EP | 1046617 A2 | 10/2000 |
| EP | 1065178 A1 | 1/2001 |
| EP | 1088789 A2 | 4/2001 |
| EP | 1103805 A2 | 5/2001 |
| EP | 1136452 A1 | 9/2001 |
| EP | 1 198 426 B1 | 4/2002 |
| EP | 1211227 A2 | 6/2002 |
| EP | 0905273 B1 | 10/2002 |
| EP | 1253118 A3 | 11/2002 |
| EP | 1 298 096 A2 | 4/2003 |
| EP | 1 298 096 B1 | 4/2003 |
| EP | 1298096 A2 | 4/2003 |
| EP | 1065178 B1 | 5/2003 |
| EP | 1319639 A2 | 6/2003 |
| EP | 1319736 A1 | 6/2003 |
| EP | 0823403 B1 | 7/2003 |
| EP | 0999574 B1 | 7/2003 |
| EP | 1325947 A2 | 7/2003 |
| EP | 0963797 B1 | 8/2003 |
| EP | 1336592 A1 | 8/2003 |
| EP | 1340724 A1 | 9/2003 |
| EP | 0911302 B1 | 1/2004 |
| EP | 1375702 A2 | 1/2004 |
| EP | 1375702 B1 | 1/2004 |
| EP | 1392611 A1 | 3/2004 |
| EP | 1405833 A | 4/2004 |
| EP | 0725679 B1 | 9/2004 |
| EP | 1464631 A2 | 10/2004 |
| EP | 1468970 A1 | 10/2004 |
| EP | 1468971 A1 | 10/2004 |
| EP | 1468973 A2 | 10/2004 |
| EP | 1468973 B1 | 10/2004 |
| EP | 1046617 B1 | 12/2004 |
| EP | 0870530 B1 | 1/2005 |
| EP | 1211227 B1 | 1/2005 |
| EP | 1496021 A1 | 1/2005 |
| EP | 1510504 A1 | 3/2005 |
| EP | 1 524 245 A2 | 4/2005 |
| EP | 1524245 A2 | 4/2005 |
| EP | 1392611 B1 | 5/2005 |
| EP | 1198426 B1 | 8/2005 |
| EP | 1627857 A1 | 2/2006 |
| EP | 1634856 A1 | 3/2006 |
| EP | 1319736 B1 | 5/2006 |
| EP | 1693482 A1 | 8/2006 |
| EP | 1714948 A2 | 10/2006 |
| EP | 1719561 A1 | 11/2006 |
| EP | 1731261 A1 | 12/2006 |
| EP | 1103805 B1 | 1/2007 |
| EP | 1173780 B1 | 3/2007 |
| EP | 1834933 A1 | 9/2007 |
| EP | 1 925 600 A1 | 5/2008 |
| EP | 1 925 600 B1 | 5/2008 |
| EP | 1925599 A1 | 5/2008 |
| EP | 1925600 A1 | 5/2008 |
| EP | 1298096 B1 | 7/2008 |
| EP | 1723086 A1 | 9/2008 |
| EP | 1925599 B1 | 1/2009 |
| EP | 1731261 B1 | 7/2009 |
| EP | 1925600 B1 | 3/2010 |
| EP | 2223941 A1 | 9/2010 |
| EP | 2248597 A1 | 11/2010 |
| EP | 1807259 B1 | 3/2011 |
| EP | 2305611 A2 | 4/2011 |
| EP | 1723086 B2 | 9/2011 |
| EP | 2414872 A1 | 2/2012 |
| EP | 2431338 A1 | 3/2012 |
| EP | 2436658 A1 | 4/2012 |
| EP | 2455349 A1 | 5/2012 |
| EP | 2463246 A1 | 6/2012 |
| EP | 1634856 A2 | 8/2012 |
| EP | 2489642 A1 | 8/2012 |
| EP | 1136452 B1 | 4/2013 |
| EP | 2581350 A1 | 4/2013 |
| EP | 2305611 B1 | 12/2013 |
| EP | 2725122 A1 | 4/2014 |
| GB | 2 246 567 A | 2/1992 |
| GB | 2284362 A | 5/1993 |
| GB | 2239404 B | 1/1994 |
| GB | 2284362 B | 1/1997 |
| JP | S51128311 A | 11/1976 |
| JP | S5577701 A | 6/1980 |
| JP | S57129832 A | 8/1982 |
| JP | A5987071 A | 5/1984 |
| JP | S5987071 A | 5/1984 |
| JP | S6028605 A | 2/1985 |
| JP | S6044941 A | 3/1985 |
| JP | S6071535 A | 4/1985 |
| JP | S6081041 A | 5/1985 |
| JP | S60145930 A | 8/1985 |
| JP | S60210540 A | 10/1985 |
| JP | S6158840 A | 3/1986 |
| JP | S61106438 A | 5/1986 |
| JP | S61146731 A | 7/1986 |
| JP | S6275402 A | 4/1987 |
| JP | S62132944 A | 6/1987 |
| JP | S6311530 A | 1/1988 |
| JP | S6364930 A | 3/1988 |
| JP | S63134539 A | 6/1988 |
| JP | S63182224 A | 7/1988 |
| JP | S63282139 A | 11/1988 |
| JP | S649830 A | 1/1989 |
| JP | S6433029 A | 2/1989 |
| JP | H01134307 A | 5/1989 |
| JP | H01138512 A | 5/1989 |
| JP | H01219038 A | 9/1989 |
| JP | H02192427 A | 7/1990 |
| JP | H02252633 A | 10/1990 |
| JP | H03202110 A | 9/1991 |
| JP | H03202111 A | 9/1991 |
| JP | H03202112 A | 9/1991 |
| JP | H03202113 A | 9/1991 |
| JP | H03202116 A | 9/1991 |
| JP | H03247524 A | 11/1991 |
| JP | H03295827 A | 12/1991 |
| JP | H0412063 A | 1/1992 |

(56) References Cited

FOREIGN PATENT DOCUMENTS

| | | |
|---|---|---|
| JP | H0465333 A | 3/1992 |
| JP | H05146615 A | 6/1993 |
| JP | 05238773 A | 9/1993 |
| JP | H05306136 A | 11/1993 |
| JP | H0648745 A | 2/1994 |
| JP | H06101050 A | 4/1994 |
| JP | H06183771 A | 7/1994 |
| JP | H06219767 A | 8/1994 |
| JP | H0710594 A | 1/1995 |
| JP | H07187698 A | 7/1995 |
| JP | H07242438 A | 9/1995 |
| JP | H07300332 A | 11/1995 |
| JP | H08217480 A | 8/1996 |
| JP | H08301615 A | 11/1996 |
| JP | 09071430 A | 3/1997 |
| JP | H0995133 A | 4/1997 |
| JP | H09110454 A | 4/1997 |
| JP | H09188523 A | 7/1997 |
| JP | H1081533 A | 3/1998 |
| JP | S63139032 A | 6/1998 |
| JP | H10194785 A | 7/1998 |
| JP | H10338555 A | 12/1998 |
| JP | H11123334 A | 5/1999 |
| JP | H11246228 A | 9/1999 |
| JP | 2000044289 A | 2/2000 |
| JP | 2000125075 A | 4/2000 |
| JP | 2000327359 A | 11/2000 |
| JP | 2001048572 A | 2/2001 |
| JP | 2001151537 A | 6/2001 |
| JP | 2001154016 A | 6/2001 |
| JP | 2001220155 A | 8/2001 |
| JP | 2001-294431 A | 10/2001 |
| JP | 2001 302258 A | 10/2001 |
| JP | 2002243368 A | 8/2002 |
| JP | 2002267827 A | 9/2002 |
| JP | 2003040626 A | 2/2003 |
| JP | 2003048739 A | 2/2003 |
| JP | 2003119034 A | 4/2003 |
| JP | 2003160342 A | 6/2003 |
| JP | 2003192355 A | 7/2003 |
| JP | 2003212553 A | 7/2003 |
| JP | 2003262473 A | 9/2003 |
| JP | 2003347266 A | 12/2003 |
| JP | 2004142976 A | 5/2004 |
| JP | 2004321970 A | 11/2004 |
| JP | 2004351358 A | 12/2004 |
| JP | 2004359513 A | 12/2004 |
| JP | 3735887 B2 | 1/2006 |
| JP | 2006193361 A | 7/2006 |
| JP | 2006206337 A | 8/2006 |
| JP | 2006248884 A | 9/2006 |
| JP | 2007131487 A | 5/2007 |
| JP | 2007313435 A | 12/2007 |
| JP | 2008127260 A | 6/2008 |
| JP | 2008170143 A | 7/2008 |
| JP | 2010042940 A | 2/2010 |
| JP | 4424232 B2 | 3/2010 |
| JP | 4465932 B2 | 5/2010 |
| JP | 2011236071 A | 11/2011 |
| JP | 2012006797 A | 1/2012 |
| JP | 2012006799 A | 1/2012 |
| JP | 2013020022 A | 1/2012 |
| JP | 2012031034 A | 2/2012 |
| JP | 2012036014 A | 2/2012 |
| JP | 2012062203 A | 3/2012 |
| JP | 2012116731 A | 6/2012 |
| JP | 2012166992 A | 9/2012 |
| JP | 2012193057 A | 10/2012 |
| JP | 2012246180 A | 12/2012 |
| JP | 2013006767 A | 1/2013 |
| JP | 2013037217 A | 2/2013 |
| JP | 5238773 B2 | 7/2013 |
| JP | 2013173628 A | 9/2013 |
| JP | 2013249213 A | 12/2013 |
| JP | 2014009105 A | 1/2014 |
| KR | 20000038422 A | 7/2000 |
| KR | 20010060246 A | 7/2001 |
| KR | 20010080860 A | 8/2001 |
| KR | 20030083848 A | 11/2003 |
| KR | 20080046561 A | 5/2008 |
| KR | 20090056391 A | 6/2009 |
| MX | PA00006579 A | 2/2005 |
| MX | PA04010649 A | 10/2005 |
| MX | 2007005085 A | 6/2007 |
| RO | 100114 B1 | 10/1990 |
| RO | 121337 B1 | 3/2007 |
| RU | 2390425 C1 | 5/2010 |
| RU | 2390426 C1 | 5/2010 |
| TW | 1254035 B | 5/2006 |
| WO | 8200827 A1 | 3/1982 |
| WO | 8706927 A1 | 11/1987 |
| WO | 8707559 A1 | 12/1987 |
| WO | 9008334 A1 | 7/1990 |
| WO | 9009356 A1 | 8/1990 |
| WO | 9011540 A1 | 10/1990 |
| WO | 9308500 A1 | 4/1993 |
| WO | 9311077 A1 | 6/1993 |
| WO | 9325301 A1 | 12/1993 |
| WO | 9511751 A1 | 5/1995 |
| WO | 9609260 A1 | 3/1996 |
| WO | 9726222 A1 | 7/1997 |
| WO | 9739988 A1 | 10/1997 |
| WO | 9841397 A1 | 9/1998 |
| WO | 9947236 A1 | 9/1999 |
| WO | 9950203 A1 | 10/1999 |
| WO | 0037385 A1 | 6/2000 |
| WO | 0060375 A1 | 10/2000 |
| WO | 01/04065 A1 | 1/2001 |
| WO | 0104065 A1 | 1/2001 |
| WO | 0112567 A1 | 2/2001 |
| WO | 0119746 A1 | 3/2001 |
| WO | 0125503 A1 | 4/2001 |
| WO | 0145820 A1 | 6/2001 |
| WO | 0207181 A1 | 1/2002 |
| WO | 02079108 A1 | 10/2002 |
| WO | 02081388 A2 | 10/2002 |
| WO | 02083581 A2 | 10/2002 |
| WO | 02088036 A1 | 11/2002 |
| WO | 02/102724 A1 | 12/2002 |
| WO | 02102724 A1 | 12/2002 |
| WO | 03037613 A1 | 5/2003 |
| WO | 2004/002911 A1 | 1/2004 |
| WO | 2004002911 A1 | 1/2004 |
| WO | 2004029326 A2 | 4/2004 |
| WO | 2005061400 A1 | 7/2005 |
| WO | 2006052578 A3 | 5/2006 |
| WO | 2006058517 A1 | 6/2006 |
| WO | 2006070395 A1 | 7/2006 |
| WO | 2006123838 A2 | 11/2006 |
| WO | 2007136670 A1 | 11/2007 |
| WO | 2008062448 A3 | 5/2008 |
| WO | 2009093134 A2 | 7/2009 |
| WO | 2009116300 A1 | 9/2009 |
| WO | 2011016998 A2 | 2/2011 |
| WO | 2011027035 A1 | 3/2011 |
| WO | 2011061569 A1 | 5/2011 |
| WO | 2011088515 A1 | 7/2011 |
| WO | 2012112279 A1 | 8/2012 |
| WO | 2012148744 A1 | 11/2012 |
| WO | 2013015752 A1 | 1/2013 |
| WO | 2013/081827 A1 | 6/2013 |
| WO | 2013081827 A1 | 6/2013 |
| WO | 2014002666 A1 | 1/2014 |
| WO | 2014002666 A8 | 1/2014 |
| WO | 2014043267 A1 | 3/2014 |

OTHER PUBLICATIONS

Learn about Fluid Engineering, 1.2 Mesh to Micron Conversion Table from http_www.fluideng.com_TechInfo_MeshMicronConversion.php.

(56) References Cited

OTHER PUBLICATIONS

Bee, Jared S., et al."Effects of Surfaces and Leachables on the Stability of Biopharmaceuticals" Journal of Pharmaceutical Sciences, vol. 100, No. 10, Oct. 2011.

Jiang, Jiagin "Apparatus and Techniques for Study of Unsteady Thermal/Fluid-Induced Loads on Electronic Components", Master Thesis, San Jose State University, 1993.

"Weed Washer" What is a Micron? (Micron v/s Mesh) Micron and Mesh, ICPI Workshop 2011.

Orlov, A. N. et al. "The Main Design and Technological Features of In-Line and Sectional Machines of the IS Type Made by Mole Bros. (USA)" All-Union Scientific- Research and Planning and Design Institute of Glass Machinery. Translated from Steklo i Keramika,, No. 12, pp. 32-33, Dec. 1975.

Holdich, Richard et al. "Pore Design and Engineering for Filters and Membranes" Philosophical Transaction of the Royal Society vol. 364 pp. 161-174, 2006.

Lueger "Machine Manufacturing Bottles" vol. 8. p. 370. 1976 and its English Translation.

"International Standard: Space Systems—Surface Cleanliness of Fluid Systems Part 2: Cleanliness Levels" ISO 14952-2. Nov. 15, 2003.

"International Standard: Space Systems—Surface Cleanliness of Fluid Systems Part 3: Analytical Procedures for the Determination of Nonvolatile Residues and Particulate Contamination" ISO 14952-3. Nov. 15, 2003.

"International Standard: Space Systems—Surface Cleanliness of Fluid Systems Part 4: Rough-Cleaning Processes" ISO 14952-4. Nov. 15, 2003.

"International Standard: Space Systems—Surface Cleanliness of Fluid Systems Part 6: Precision-Cleaning Processes" ISO 14952-6. Nov. 15, 2003.

"Standard Specification for Industrial Woven Wire Cloth" Designation: E2016-11 ASTM International.

"Stainless Steel Flat Products for Building the Grades in EN 10088-4 Explained" Building Series, vol. 18. pp. 1-26. Euro Inox: The European Stainless Steel Development Association.

"Standard Specification for Passivation of Stainless Steels Using Electropolishing" Designation: B912-02. ATSM International.

"Airborne Particulate Cleanliness Classes in Cleanrooms and Clean Zones" Federal Standard 209E. U.S. General Services Administration. pp. 1-48. Sep. 11, 1992.

"Stainless Steels—Part 1: List of Stainless Steels" English Version of EN 10088-1:2014, English Translation of DIN EN 10088-1. Dec. 2014.

* cited by examiner

GLASS FORMING MACHINE PARTICLE FILTER, A PLUNGER UNIT, A BLOW HEAD, A BLOW HEAD SUPPORT AND A GLASS FORMING MACHINE ADAPTED TO OR COMPRISING SAID FILTER

CROSS-REFERENCE TO RELATED APPLICATIONS

This application is a National Stage application of International Patent Application No. PCT/EP2015/000244, filed on Feb. 6, 2015, which claims priority to U.S. Provisional Application No. 62/079,208, filed on Nov. 13, 2014, each of which is hereby incorporated by reference in its entirety.

TECHNICAL FIELD

The present patent application relates to a glass (container) forming machine particle filter, a plunger unit, a blow head, a blow head support and a glass forming machine adapted to or comprising said filter.

BACKGROUND

In the mechanized container glassmaking sector, a gob is cut from the glass melt in the furnace via a feeder and fed via a delivery system to a blank mold in which a solid body with a certain cavity is formed in accordance with weight and the bottle shape finally targeted later. This generally happens by virtue of the fact that the gob from the glass melt firstly slides via the abovementioned delivery system into the blank mold and is then set or blown downward from above against the mold wall whereupon a cavity is blown into the solid gob body by a counterblow from below, as a result of which an upper region of the later glass container, specifically a finish of the later glass container—commonly called parison—, is already formed in the lower region of the blank mold. This method is denoted as a blow-and-blow process-type.

Furthermore, there also exists a method called a press-and-blow process-type in which a bottle body is firstly prepressed from below via a plunger.
The counterblow necessary to form the parison in the blank mold—also called a parison mold—is done with compressed air via a plunger unit into the gob from underneath after the plunger is drawn back a little bit—preferably downward—from the gob in the blank mold above.

In case of the two abovementioned methods, the parisons thus preformed, which are still unfinished but already have an incipient inner cavity, are therefore brought from the blank into the finish mold, something which can happen by virtue of the fact that a swinging arm that has a finish support gripping the parison in the region of its finish brings the preformed glass body (the parison) from the blank mold, which is opening for this purpose, into a finish mold, which is likewise opening for this purpose, the parison being rotated by 180° about its horizontal axis, and the finish thus now pointing upward in the finish mold. After reheating, if appropriate—this glass body (parison) is then finally blown—doing so now from above—with compressed air via a blow head comprising a blowing passage (air channel) (and preferably a tube), The blow head is preferably mounted on a blow head support. The glass container is blown in the finish mold station into its final shape in the finish mold whereupon it can be removed after opening of the finish mold, preferably by take-out-tongs onto a conveyor belt for further transportation in the product flow process.

See for example of aforesaid glass forming process FIGS. 1 to 4 relating to prior art as well as such early publications as Lueger/Matthée Lexikon der Fertigungstechnik ("Dictionary of Production Engineering"), 4th edition, Stuttgart 1967, vol. 8, page 370.

In glass container forming machines working in accordance with aforesaid production methods i.e. in so called I.S. glass forming machines it could appear rarely that a very small particle arising from the glass container forming machine (made of steel parts mainly) itself is blown by the counterblow into the parison or by the final blow into the finally moulded glass container. Because of the temperature of the parison as well as the finally moulded glass container such particles may be adhesive to the inner glass surface of the parison or the glass container to be finished and thus will remain on said inner surface. Especially in case of the production of a glass container used for food storage purposes, i.e. baby food glass containers but primarily in case of the production of glass containers for a storage of pharmaceutical products even such rare entries of aforesaid small particles i.e. oxidizing particles such as oxidizing or already oxidized iron or steel particles should be avoided because such particles may have negative effects on phamaceuticals exposed to said particles. While glass for example i.e borosilacte is the most commonly used and normally suitable primary container material for phamaceuticals i.e. biophamaceuticals (See: Bee, Jared S.; Randolph, Theodore W.; Carpenter, John F.; Bishop, Stephen M.; Mitrova, Mariana N.; "*Effects of Surfaces and Leachables on the Stability of Biopharmaceuticals*", Journal of Phamaceutical Sciences, Vol. 100, No. 10, October 2011, p. 4158-4170, 4162, right column.) nevertheless foreign particles (See: Bee et al., ibid., p. 4160, left column.) for example steel particles could lead to an "*agglomeration of protein-coated particles and/or nucleated formation of larger aggregates of a mAb* [monoclonal antibody, author's remark]" (See: Bee et al., ibid., p. 4161, right column.). Thus, a contamination of the inner area of glass container used for aforesaid purposes should be avoided as far as technically possible.

Unfortunately such entry prevention of small particles into the parison or final glass container is a quite complicate technical task.

One problem arises from the possible source of aforesaid particles. As already mentioned particles contaminating the glass container could derive from the components of the glass forming machine itself, i.e. from metal (steel) parts of aforesaid machine. Therefore an entry prevention of such unintentional particles has to be positioned as close as possible to the glass container or parison to be formed in order to avoid that particles from machine parts after the entry prevention system will jeopardize such technical precautionary measures.

SUMMARY

So, it is an object of the present invention to provide a particle entry prevention for glass containers produced in a glass forming machine operating according to said blow-and-blow type-process or said press-and-blow type-process, i.e. said I.S. glass forming machine that is able to operate very close to said parison or said glass container to be finished.

Another problem derives from the necessary air pressure for said counterblow in order to form the parison as well as said final blow to mould the glass container finally on one side and the relatively small particles on the other side. A particle contamination prevention shouldn't have any significant impact on the necessary air pressure for aforesaid blow processes, otherwise a glass container could not be formed economically i.e. properly formed in adequate time, but, of course has to catch all particles bigger than a certain amount, whereby said certain diameter has to be as small as possible.

Thus, it is furthermore an object of the present invention to provide a particle entry prevention for glass containers produced in a glass forming machine operating according to said blow-and-blow type-process or said press-and-blow type-process, i.e. said I.S. glass forming machine that does have a preferably small (enough)—most preferably no— reduction effect on the air pressure necessary to form said glass container in adequate time.

Aforesaid objects of the present invention are solved by a particle filter according to claim 1 as well as a plunger unit according to claim 28, a blow head according to claim 31, a blow head support according to claim 34 and a glass forming machine of a blow-and-blow process-type or a press-and-blow process-type according to claim 37.

Dependent claims relate to and disclose further suitable and/or preferable and/or advantageous embodiments of the present invention.

As already mentioned above it is an object of the present invention to provide a particle entry prevention for glass containers produced in a glass forming machine operating according to said blow-and-blow type-process or said press-and-blow type-process, i.e. said I.S. glass forming machine that is able to operate very close to said parison or said glass container to be finished as well as to provide a particle entry prevention for glass containers produced in said glass forming machine that does reduce the air pressure necessary to form said glass container in adequate time only in a tolerable amount (preferably does not reduce said air pressure), but is able to prevent said parisons and glass-containers from contamination with particles being as small as possible.

This problem is solved in accordance with the present invention by a particle filter for a glass forming machine operating according to a blow-and-blow process or according to a press-and-blow process—preferably an I.S. glass forming machine—, said particle filter is adapted for placing in at least an air channel serving pressurized air for counter blow of a parison in a blank mold forming station of said glass forming machine, and/or an air channel serving pressurized air for final blow and/or for finish cooling of a glass container made of said parison in a finish mold station of said glass forming machine, said particle filter comprising a surface filter as a main filter media and said particle filter, if placed in at least said air channel serving pressurized air for counter blow of said parison in said blank mold forming station of said glass forming machine, and/or said air channel serving pressurized air for final blow and/or for finish cooling of said glass container made of said parison in said finish mold station of said glass forming machine, avoiding passage of particles above a certain size from a dirty side of said main filter media to a clean side of said main filter media and thus, also avoiding final passage of said particles above said certain size into said parison or said glass container formed, respectively blown by said glass forming machine;

and by a plunger unit comprising at least an air channel for counter blow of a parison and said plunger unit suitable to be positioned in a plunger cylinder underneath a blank mold forming station of a glass forming machine of a blow-and-blow process-type, preferably an I.S. glass machine, wherein said plunger unit preferably at least said air channel of said plunger unit—is adapted to receive a particle filter according to the present invention;

and by a blow head comprising at least an air channel for final blow and/or for finish cooling of a glass container made of a parison and said blow head suitable to be positioned above a finish mold station of a glass forming machine of a blow-and-blow process-type or a press-and-blow process-type, preferably an I.S. glass machine, wherein said blow head—preferably at least said air channel of said blow head—is adapted to receive a particle filter according to the present invention;

and by a blow head support for support of a blow head comprising at least an air channel for supply of said blow head with pressurized air and said blow head support suitable to be positioned above said blow head suitable to be positioned itself above a finish mold station of a glass forming machine of a blow-and-blow process-type or a press-and-blow process-type, preferably an I.S. glass machine, wherein said blow head support— preferably at least said air channel of said blow head support—is adapted to receive a particle filter according to the present invention;

and a glass forming machine of a blow-and-blow process-type or a press-and-blow process-type, said glass forming machine adapted to receive at least one particle filter according to the present invention and wherein said glass forming machine comprises an air channel serving pressurized air for counter blow of a parison in a blank mold forming station of said glass forming machine and/or an air channel serving pressurized air for final blow and/or for finish cooling of a glass container made of said parison in a finish mold station of said glass forming machine and said air channel of said glass forming machine is adapted to receive said particle filter.

In a preferred embodiment of a glass forming machine in accordance with the present invention said glass forming machine comprises a particle filter according to the present invention and said particle filter is already placed in at least said air channel of said glass forming machine adapted to receive said particle filter. If there is more than one of said air channels preferably in each of said air channels a particle filter according to the present invention is situated in order to prevent unwanted contamination with particles of parisons and/or glass containers formed (blown) during operation of said glass forming machine.

The particle filter according to the present invention could be secured in said glass forming machine air channel by a safety ring, preferably a Seegering™ that fits into a slot of said glass forming machine air channel. Thus said particle filter will not fall down to the ground during assembly nor will it be lifted due to an air blowback.

In a preferred embodiment of a glass forming machine according to the present invention the said glass forming machine air channel is adapted to said particle filter in such a way that said particle filter can properly be placed in said glass forming machine air channel only in a position, in which said particle filters main filter medias dirty side is situated on the incoming air side of said air channel to prevent said glass forming machine from a false installation of said particle filter. Especially in an assembly situation a new or cleaned particle filter could be confused with the dirty particle filter. In such a situation it is important that the confused dirty filter is mounted in its original orientation in the glass forming machines air channel because otherwise the particles collected before the main filter media are blown into the parisons or glass containers produced after such a faulty filter assembly.

The glass forming machine according to the present invention preferably comprises
a plunger unit according to the present invention, and/or
a blow head according to the present invention, and/or
a blow head support according to the present invention.

A preferred plunger unit according to the present invention comprises a particle filter according to the present invention where said particle filter is already placed in at least said air channel of said plunger unit adapted to said particle filter. Preferably said particle filter is placed in said plunger unit air channel during operation of said glass forming machine to prevent parisons and/or glass containers from contamination with undesired particles.

In a further embodiment of a plunger unit according to the present invention said plunger unit comprises a plunger and a plunger adapter to be adapted to—preferably (already) connected with, e.g. inserted into—the plunger—preferably inserted into or screwed together with, more preferably from below—, said plunger adapter comprising said air channel with said particle filter to be placed—preferably said particle filter is already placed in said air channel of said plunger adapter—. The use of such an adapter is more flexible because not every type of different plungers used in said glass forming machine have to be constructed for placement of a particle filter in accordance with the present invention, but only said adapter that, of course has to fit the different plungers on one hand, but also has to be designed for proper placement of said particle filter according to the present invention.

Of course a plunger unit according to the present invention preferably comprise only a plunger.

The particle filter according to the present invention is preferably secured in said plunger unit air channel by a safety ring, preferably a Seegering™ that fits into a slot of said plunger unit air channel. Thus said particle filter will not fall down to the ground during assembly i.e. in said plunger unit—e.g. during assembly in the plunger itself or said plunger adapter—nor will it be lifted due to an air blowback.

In a preferred embodiment of a plunger unit according to the present invention said plunger units air channel is adapted to said particle filter in such a way that said particle filter can properly be placed in said plunger unit air channel only in a position, in which said particle filter's main filter media's dirty side is situated on the incoming air side of said plunger unit air channel to prevent said plunger unit from a wrong assembly of said particle filter. E.g. during assembly of a new or clean(ed) particle filter the clean(ed) particle filter could be confused with the dirty particle filter. Thus, it is important that even a confused dirty filter could be mounted only in its original orientation in the plunger unit air channel, because otherwise after such a wrong filter assembly the particles collected at the dirty side of the main filter media are blown into the parisons produced. So, said plunger unit air channel is preferably adapted to said particle filter in such a way that said particle filter projects beyond said plunger unit if improperly placed in said plunger unit air channel, e.g. in wrong orientation or wrong direction and thus, said plunger unit cannot be mounted properly into the glass forming machines blank mold forming station if said particle filter is mounted faulty and projects therefore beyond the plunger unit.

Furthermore a blow head is proposed according to the present invention, preferably said blow head comprises a particle filter according to the present invention where said particle filter is already placed in at least said air channel of said blow head adapted to said particle filter. Preferably said particle filter is placed in said blow head air channel, preferably during operation of said glass forming machine to prevent glass containers from contamination with undesired particles.

The particle filter according to the present invention is preferably secured in said blow head air channel by a safety ring, preferably a Seegering™ that fits into a slot of said blow head air channel. Thus, said particle filter will not fall down to the ground during assembly—e.g. during assembly in the blow head—nor will it be lifted due to an air blowback in the blow head from the glass container to be blown finally underneath the blow head.

In a further preferred embodiment of the blow head according to the present invention said blow head air channel is adapted to said particle filter in such a way that said particle filter can properly be placed in said blow head air channel only in a position, in which said particle filter's main filter media's dirty side is situated on the incoming air side of said blow head air channel to prevent said blow head from a faulty assembly of said particle filter. I.e. during assembly of a new or clean(ed) particle filter the clean particle filter could be confused with the dirty particle filter. But, it is very important to prevent an already dirty particle filter from its wrong assembly, that is e.g. in opposite of its original orientation in the blow head air channel, because otherwise the particles collected at the dirty side of the main filter media are blown into glass containers produced after such a wrongly oriented filter assembly. So, said blow head air channel is preferably adapted to said particle filter in such a way that said particle filter projects beyond said blow head if improperly placed in said blow head air channel, e.g. in wrong orientation or wrong direction and thus, said blow head cannot be mounted properly into the glass forming machine's finish mold station, because said particle filter is mounted in wrong position and projects therefore beyond the blow head that will therefore not fit into the glass forming machine's finish mold station.

Not only a blow head is proposed according to the present invention, but also a blow head support comprising at least an air channel for supply of said blow head support with pressurized air and said blow head support for placement above said blow head that is suitable for placement of itself above said finish mold station of the glass forming machine, said blow head support preferably comprising a particle filter according to the present invention and where said particle filter is already placed in at least said air channel of said blow head support adapted to said particle filter, preferably during operation of said glass forming machine to prevent glass containers from contamination with undesired particles.

Once again, the particle filter according to the present invention is preferably secured in said blow head support air channel by a safety ring, preferably a Seegering™ that fits into a slot of said blow head support air channel. Therefore, said particle filter will not fall down to the ground during assembly i.e. in said blow head support nor will it be lifted due to an air blowback in the blow head support from the glass container to be blown finally underneath the blow head below the blow head support.

In a preferred embodiment of the blow head support according to the present invention said blow head support air channel is adapted to said particle filter in such a way that said particle filter can properly be placed in said blow head air channel only in a position, in which said particle filter's main filter media's dirty side is situated on the incoming air side of said blow head air channel to prevent said blow head from a wrong assembly of said particle filter. Preferably during assembly of a new or clean(ed) particle filter the clean particle filter could be confused with the dirty particle filter. Thus, it is of great importance to prevent an unclean particle filter from its wrong assembly, i.e an assembly that is in opposite of its original orientation in the blow head support air channel, because otherwise the particles collected at the dirty side of the main filter media are blown into glass containers produced after such a faulty oriented filter assembly. Therefore, said blow head support air channel is preferably adapted to said particle filter in such a way that said particle filter projects beyond said blow head support if improperly placed in said blow head support air channel, for instance in wrong orientation or wrong direction and thus, said blow head support cannot be properly mounted into the glass forming machine's finish mold station, because said particle filter is assembled in wrong position and projects therefore beyond the blow head support that will therefore not fit into the glass forming machine's finish mold station.

So, the particle filter for a glass forming machine according the present invention is preferably adapted for placing in at least
said air channel serving pressurized air for counter blow of said parison in said blank mold forming station before or after a manifold that distributes said pressurized air to at least one said blank mold forming station, and/or
said air channel serving pressurized air for final blow and/or for finish cooling of said glass container made of said parison in said finish mold station before or after a manifold that distributes said pressurized air to at least one said finish mold station.

In a preferred embodiment of the particle filter for a glass forming machine according to the present invention, said particle filter is adapted for placing in at least
said air channel situated in a plunger unit and serving pressurized air for counter blow of said parison in said blank mold forming station of said glass forming machine and said plunger unit situated in a plunger cylinder underneath said blank mold forming station of said glass forming machine, and/or
said air channel situated in a blow head and serving pressurized air for final blow and/or for finish cooling of said glass container made of said parison in said finish mold station and said blow head situated above said finish mold station of said glass forming machine, and/or
said air channel situated in a blow head support for supply of said blow head with pressurized air for final blow and/or for finish cooling of said glass container made of said parison in said finish mold station and for support of said blow head and said blow head support situated above said blow head that is situated itself above said finish mold station of said glass forming machine
and said particle filter, if placed in at least
said air channel situated in said plunger unit and serving pressurized air for counter blow of said parison in said blank mold forming station of said glass forming machine and said air plunger unit situated in said plunger cylinder underneath said blank mold forming station of said glass forming machine, and/or
said air channel situated in said blow head and serving pressurized air for final blow and/or for finish cooling of said glass container made of said parison in said finish mold station and said blow head situated above said finish mold station of said glass forming machine, and/or
said air channel situated in said blow head support for supply of said blow head with pressurized air for final blow and/or for finish cooling of said glass container made of said parison in said finish mold station and for support of said blow head and said blow head support situated above said blow head that is situated itself above said finish mold station of said glass forming machine
avoids passage of said particles above said certain size from said dirty side of said main filter media to said clean side of said main filter media and thus also avoids final passage of said particles into said parison or said glass container blown (formed) by said glass forming machine.

The main filter media of the particle filter according to the present invention preferably comprises a slotted filter, for instance with slotted holes. Such slotted filter media can be produced for small pore sizes similar to track-etched filter media, but with an advantageously relatively high open filter area much better than in case of a track-etched filter media (See: Holdich, Richard; Kosvintsev, Serguei; Zhadanov, Sergey; "Pore design and engineering for filters and membranes", Philosophical Ttransactions of the Royal Society, Mathematical, Physical & Engineering Sciences, Vol. 364, 2006, p. 161-174, 163 et seq.) and with an advantage of a better flow resistance in comparison with a circular pore filter media. Preferred is a ratio of length to diameter of a slot of between 5 to 20 (See: Holdich et al, ibid, p. 167, FIG. 3 and second para.). For instance such slotted filter media preferably comprises a silicon substrate covered by a—preferably thin—layer of silicon nitride (See: Holdich et al., ibid, p. 163 et seq.).

But, of course the main filter media of the particle filter according to the present invention could also comprise a sieve filter that also preferably comprises a silicon substrate covered by a layer of silicon nitride (See: Holdich et al., ibid, p. 164.).

In a further preferred embodiment the particle filter for a glass forming machine according to the present invention comprises said sieve filter of said main filter media with a mesh, preferably a PSW (Plain Square Woven) or a TSW (Twill Square Woven) mesh—preferably a wire mesh—made of an anti-corrosive material. For the particle separation PSW (Plain Square Woven) weave type of the mesh is preferred, but also other types of weaves like a TSW (Twill Square Woven) mesh are possible.

Preferably a wire mesh is made of an anti-corrosive metal or metal alloy, more preferably made of anti-corrosive metal or metal alloy with a yield strength of in minimum 200 $N/mm^2$ and more preferably a yield strength of 350 $N/mm^2$ in minimum or most preferably 450 $N/mm^2$ in minimum. More preferably said anti-corrosive material of said sieve filter of said main filter media is stainless steel, preferably a X5CrNiMo17-12-2 steel according to the European norm EN 1.4401 or the equivalent American norm AISI 316 (S31800 in the Unified Numbering System [UNS]). Stainless steel differs from carbon steel by the amount of chromium present. Unprotected carbon steel rusts readily when exposed to air and moisture. This iron oxide film (the rust) is active and accelerates corrosion by forming more iron oxide, and due to the greater volume of the iron oxide this tends to flake and fall away. Stainless steels contain sufficient chromium to form a passive film of chromium oxide, which prevents further surface corrosion by blocking oxygen diffusion to the steel surface and blocks corrosion from spreading into the metal's internal structure, and due to the similar size of the steel and oxide ions they bond very strongly and remain attached to the surface. Thus, stainless steel is suitable to meet the requirement of the present invention, that is not to contaminate the pressurized air with particles (i.e. rust particles) itself. Preferably the stainless steel is additionally passivated, most preferably by electropolishing. Furthermore X5CrNiMo17-12-2 steel is strong enough to retain high speed particles arriving on the dirty filter side because its yield strength is ≥200 N/mm² (200 Mega Pascal [MPa]), typically between 350 N/mm² band 370 N/mm².

Furthermore it is necessary that the particle filter according to the present invention does on one hand stop undesired particles, but does also not cause a pressure drop that is too high to guarantee that a parison and/or a final glass container can be blown (formed) in the glass forming machine in sufficient time. The air pressure in the glass forming machine is typically in maximum 4 bar (1 bar=100 000 Pascal [Pa]), but it might be lower (down to 1.2 bar). To ensure a proper glass forming of the parison and/or the final glass container a minimum of 1 bar air pressure is necessary. So the particle filter should cause a pressure drop in maximum of 0.1 bar, more preferably in maximum of 0.05 bar, most preferably no pressure drop.

In case of a slotted as well as in case of a circular filter media the pressure drop of such filter media could be calculated in case of steady flow. According to Holdich et al. (see: Holdich et al., ibid, p. 166, equation (2.2) and (2.3)) the pressure drop is $$\Delta p = \left[\frac{12L\mu}{ld^3} + \frac{32\mu}{\pi l d^2}\right] \frac{Q}{N} f_2(k) \text{ with } f_2(k) = \frac{-\pi^2 k^2}{8\ln\left[\cos\left(\frac{\pi k}{2}\right)\right]}$$

where L is the pore depth i.e. the flow channel height (preferably the thickness of the filter media),
μ is the coefficient of dynamic viscosity of the flow media (preferably air in case of the present invention),
l is the slot length,
d is the slot width,
l=d i.e. in case of circular pores ore quadratic pores (preferably in case of a Plain Square Woven [PSW] or a Twill Square Woven [TSW] sieve),
Q is the flow rate,
N is the number of pores, and
k is the fraction of open filter area.

In case of the present invention the counterblow to form the parison as well as the final blow to form the glass container and/or the finish cooling air flow is not necessarily a steady flow, but could also be an unsteady flow especially during the initial phase of the blow and due to blowbacks that could appear i.e. in the finish mold station (For that reason a safety ring is also proposed by the present invention to secure the particle filter in the air channel.).

It is not clear what the exact equation for pressure drop will be in such an unsteady flow situation, but it might be clear—i.e. in view of the aforesaid given equation for the pressure drop Δp—that especially the open filter area is of essential importance for the pressure drop caused by the particle filter ($f_2(k)\to 0$, if $k\to 1$ thus leads to a decreasing pressure drop Δp for increasing open filter area).

Experiments with a main filter media with a maximum pore size of 110 micron (in the United States: US mesh 165) have shown no or no significant pressure drop (see FIG. 32).

Thus, if a wire mesh is used preferably wire cloth dimension should follow—most preferably need to follow—ASTM E2016-11 standard (Standard of the American Society for Testing and Materials), because a constant mesh wire diameter is highly important to maintain and ensure desired filtration and necessary opening space for sufficient air flow.

Experiments led to a preferred embodiment of the particle filter according to the present invention that comprises a main filter media with a (maximum) pore size of 100 micron (in the United States: US mesh 160) and an open filter area fraction of about 40% with insignificant pressure drop for the purpose of the present invention.

More preferably the (maximum) pore size of said main filter media could be reduced to 40 micron (μm) (equivalent to US mesh 325) without further significant air pressure drops and with an open filter area fraction of about 30% (wire diameter: 0.0014 inch that is 0.0356 mm). Even a reduction to a (maximum) pore size of 25 micron (US mesh 500) and an open filter area fraction of 25% (wire diameter: 0.0010 inch that is 0.0254 mm) will not result in an air pressure drop that avoids a parison and/or final glass container blow in adequate time.

Furthermore a particle filter for a glass forming machine according to the present invention could comprise also an additional surface filter as a protective filter media more coarse than said main filter media and wherein said protective filter media is situated on said dirty side of said main filter media in order to protect said main filter media against impact of particles, preferably bigger particles that might have a greater momentum according to their greater mass than smaller particles of less mass at the same velocity of both particles caused by the stream of pressurized air (p=m·v). Thus, the protective filter media protects the main filter media against impacts of such bigger particles with a greater momentum.

Also this protective filter media comprises a mesh, preferably a PSW (Plain Square Woven) mesh or a TSW (Twill Square Woven) mesh—preferably a wire mesh—made of anti-corrosive material, preferably anti-corrosive metal or metal alloy, more preferably made of anti-corrosive metal or metal alloy with a yield strength of in minimum 200 N/mm² and more preferably a yield strength of 350 N/mm² in minimum or most preferably 450 N/mm² in minimum, most preferably with a higher yield strength than the material of said main filter media and/or with a mesh wire diameter thicker than a mesh wire diameter of said main filter media.

Preferably said anti-corrosive material of said wire mesh of said protective filter media is stainless steel, preferably a X5CrNiMo17-12-2 steel according to the European norm EN 1.4401 or the equivalent American norm AISI 316 as already explained in the context of said main media filter. Also said mesh of said protective filter media made of an anti-corrosive metal or metal alloy can also be passivated, additionally preferably by electropolishing.

In a further preferred embodiment the particle filter according to the present invention comprises also a porous support mean—preferably more coarse than said main filter media—and wherein said porous support mean is situated on said clean side of said main filter media to stabilize said main filter media against forces arising from particles arriving on said dirty side of said main filter media. Said porous support mean could also comprise a mesh, preferably a PSW (Plain Square Woven) mesh or a TSW (Twill Square Woven) mesh—preferably a wire mesh—, said mesh being preferably more coarse than said main filter media itself. In case of an impact of a particle on the dirty side of the main filter media the momentum of that arriving particle causes a force arising from that particle that depends on the mass and the velocity of said particle as well as the deceleration time necessary to stop the particle. The deceleration time is dependent on the resiliency of the main filter media absorbing the energy brought in by the arriving particle. If the material of the main filter media is not sufficiently resilient i.e. due to insufficient yield strength of its material it may happen that the filter media is plastically deformed or in certain cases the filter media will be pierced by the arriving particle. To avoid this said porous support mean stabilizes the main filter media by supporting the main filter media mechanically, preferably with a stronger material and/or a more stable structure and/or more mass than in case of the main filter media. Thus, in case of a particle impact on the dirty side of the main filter media said main filter media is deformed and will get into contact with the stronger support mean on the clean side of said main filter media. The main filter media will be pressed in such a case against the stronger, preferably coarser support mean that will therefore absorb a certain part of the energy caused by the particle arriving at the clean side of the main filter media and therefore the main filter media is not stressed so much.

A further preferred embodiment of a particle filter for a glass forming machine according to the present invention comprises a porous support mean comprising a sieve filter with a mesh, preferably a PSW (Plain Square Woven) or a TSW (Twill Square Woven) mesh—preferably a wire mesh—made of anti-corrosive material, preferably made of anti-corrosive metal or metal alloy, more preferably made of anti-corrosive metal or metal alloy with a yield strength of in minimum 200 $N/mm^2$ and more preferably a yield strength of 350 $N/mm^2$ in minimum or most preferably 450 $N/mm^2$ in minimum, most preferably with a mesh wire diameter thicker than a mesh wire diameter of said main filter media and/or preferably with a higher yield strength than the material of said main filter media.

Again, said anti-corrosive material of said wire mesh of said protective filter media is preferably stainless steel, more preferably a X5CrNiMo17-12-2 steel according to the European norm EN 1.4401 or the equivalent American norm AISI 316 as already explained in the context of said main media filter. Also said mesh of said protective filter media is made of an anti-corrosive metal or metal alloy could also be passivated, additionally preferably by electropolishing.

In a further preferred embodiment of the particle filter according to the present invention said main filter media is situated between said protective filter media and said support mean. Preferably said main filter media that is situated between said protective filter media and said porous support mean is held together with said protective filter media and said porous support mean by a filter body and a fastening mean, preferably an insert mean that is adapted to—preferably connected with—said filter body, preferably inserted—more preferably pressed—into said filter body with interference fit to said filter body or screwed together with said filter body or connected the like with said filter body.

The outer dimension of said filter body can overlap the outer dimension of said fastening mean, preferably said insert mean. The latter embodiment will lead to a particle filter according to the present invention that is able to be used in an air channel only in a proper position—preferably in one orientation or direction—due to the fact of its geometry, if the respective air channel is adapted to said geometry of said particle filter. Such embodiment allows for safety reasons to avoid a wrong assembly of a particle filter in a glass forming machine, preferably in a plunger unit and/or a blow head and/or a blow head support. I.e. the wrong assembly of an already used particle filter could be harmful to parisons or glass containers to be blown (formed) by the glass forming machine because in such a case the particles formerly collected on the dirty side of the particle filter may turn to the clean side and will be blown from there into the parison and/or the final glass container, a situation that should be avoided.

Once again, said filter body and fastening mean, preferably said insert mean preferably are made of an anti-corrosive material, preferably of an anti-corrosive metal or metal alloy, preferably an anti-corrosive metal or metal alloy with a yield strength of in minimum 200 $N/mm^2$ and more preferably a yield strength of 350 $N/mm^2$ in minimum or most preferably 450 $N/mm^2$ in minimum. The anti-corrosive material of said filter body and fastening mean, preferably said insert mean is preferably stainless steel, more preferably a X5CrNiMo17-12-2 steel according to the European norm EN 1.4401 or the equivalent American norm AISI 316 as already explained in the context of said main media filter. Said filter body and said fastening mean, preferably said insert mean are made of an anti-corrosive metal or metal alloy and can be passivated additionally, too, preferably by electropolishing.

In a further most preferred embodiment of the particle filter for a glass forming machine according to the present invention, said main filter media and said protective filter media and said support mean is each a circular disc and wherein said filter body is a filter body ring and said fastening mean, preferably said insert mean is a fastening ring—preferably a press ring—that is adapted to—preferably connected with—said filter body ring, preferably inserted into said filter body ring with cylindrical interference fit to said filter body ring or screwed together with said filter body ring or connected the like with said filter body ring.

The outer diameter of said filter body ring can overlap the outer diameter of said fastening ring, preferably said press ring. This embodiment of the present invention will lead to a particle filter that is—as already explained above—able to be used in an air channel only in a proper position—preferably in one orientation or direction—due to the fact of its geometry, if the respective air channel is adapted to said geometry of said particle filter, thus, for safety reasons to avoid a wrong assembly of a particle filter in a glass forming machine, preferably in a plunger unit and/or a blow head and/or a blow head support. The circular geometry of the particle filter of the aforesaid described embodiment of the present invention is most suitable for assembly into an air channel and therefore most preferred.

As mentioned above the particle filter according to the present invention can be electropolished. This should be done preferably according ASTM B912. Electropolishing is an electrochemical etching and passivation process that is used to deburr, smooth, and brighten parts. Electrolytic reactions cause ionic conduction resulting in the removal of metal particles from parts. Metal dissolution reactions with the electrolyte form a viscous resistive layer film at the surface of the metal; the viscous layer is thicker over the valleys than over the peaks of the surface. This causes de-burring, smoothing, and brightening by removal of material from the peaks and leveling the surface. Electropolishing according to ASTM B912 may be used for de-burring of all filters. ASTM B91 specification covers the passivation of stainless steel alloys in the 300 series of the Unified Numbering System for metals and alloys (UNS3XXXX), and the use of electropolishing procedures. Electropolishing may be executed by the filter manufacturer or outsourced to a third party preferably. The filters should preferably be electropolished according to ASTM B912. If the electropolishing of the filters is outsourced the purchaser shall preferably state the following:

Alloy Designation SAE grade 316.
Appearance required bright.
The metal to be removed shall preferably not exceed 6 μm.
Finished parts should be immediately placed in clean room ISO (or equivalent) certified bags (see packaging specification) and kept sealed.

The assembled filter shall be preferably cleaned roughly according ISO 14952-4 (Part 4: Rough-cleaning processes). The actual choice of the specific cleaning material, degreaser, should be determined according to "Table 1—Selection chart for rough-cleaning processes". After cleaning tap water is used to remove the residual particles and degreaser.

The assembled filter shall preferably be cleaned precisely according ISO 14952-6 (Part 6: Precision-cleaning processes). If the precision cleaning is outsourced the purchaser shall preferably state the following. If the cleaning is done otherwise, i.e. inhouse the following shall preferably be observed and/or put into the (quality control) records:

Preferably the particle filter shall be cleaned according ISO 14952-6 (Part 6: Precision-cleaning processes) or equivalent.
Preferably the expected cleanliness level 100 for metal particle, more preferably with reference to ISO 14952-2 (Part 2: Cleanliness levels) or equivalent.
Preferably the part name, and more preferably: "Stainless Steel Air filter SAE Grade 316".
Preferably an approved cleaning method is used: more preferably ultrasonic cleaning, most preferably under avoidance of cavitation pitting.
Preferably approved cleaning material is used: more preferably Brulin 815G, Blue Gold, Alconox or equivalent.
Preferably the filter needs to be placed with the porous support mean (Support Disc) (dirty side) down into the ultrasonic cleaning unit.
The cleaning needs to be under controlled environment. Class 100,000 Federal Standard 209E clean room or equivalent.
Each filter shall preferably be bagged separately, in a bag suitable for Class 100 Federal Standard 209E (or equivalent) clean rooms after cleaning and drying, preferably 25 individually wrapped bags should than be placed into a larger bag prior to shipping.
Preferably the liquid flush test according to 14952-3 (or equivalent) shall be used as verification methods for cleanliness level.
Preferably a part number.
Preferably the quantities.

To verify the cleanliness level of the precision cleaning a liquid flush test for particle in a controlled environment ISO 14952-3 (Part 3: Analytical procedures for the determination of nonvolatile residues and particulate contamination) can be and preferably shall be performed. The liquid flush test can and preferably shall be performed on a statistically relevant population of the precision cleaning lot. Preferably, only cleaning lots which meet cleanliness level 100 for metal particle, according to ISO 14952-2 (Part 2: Cleanliness levels) "Table 1—Particle cleanliness levels", will be verified and shipped for final use. The certification of cleanliness needs to be attached on each lot.

After each cleaning process, each filter can and preferably shall be bagged separate, in a bag suitable for Class 100 Federal Standard 209E (or equivalent) clean room, 25 individually wrapped bags should than preferably be placed into a larger bag prior to shipping.

A bag specification as follows is preferably recommended:

Material: Polyethylene
Color: Clear
Cleanroom: Class 100
Size: N/A
Thick. Mils N/A In order to eliminate metal particles in the parison and later the final glass container, the present invention discloses a filtration in the counterblow and final blow air stream to filter potential metal particles. In the present application the entire range of particle filters according to the present invention as well as their point of operation in the glass forming machine particular and respective mould equipment like blow heads, blow head supports and plunger units or retaining rings (safety rings) used to fasten filters in mentioned mould equipment in regard of their design, material and cleanliness level are also described. Furthermore preferred procedures to insure desired cleanliness level are disclosed as well.

Examples of preferred embodiments of the present invention are illustrated in the drawings:

DETAILED DESCRIPTION

Figure 1:
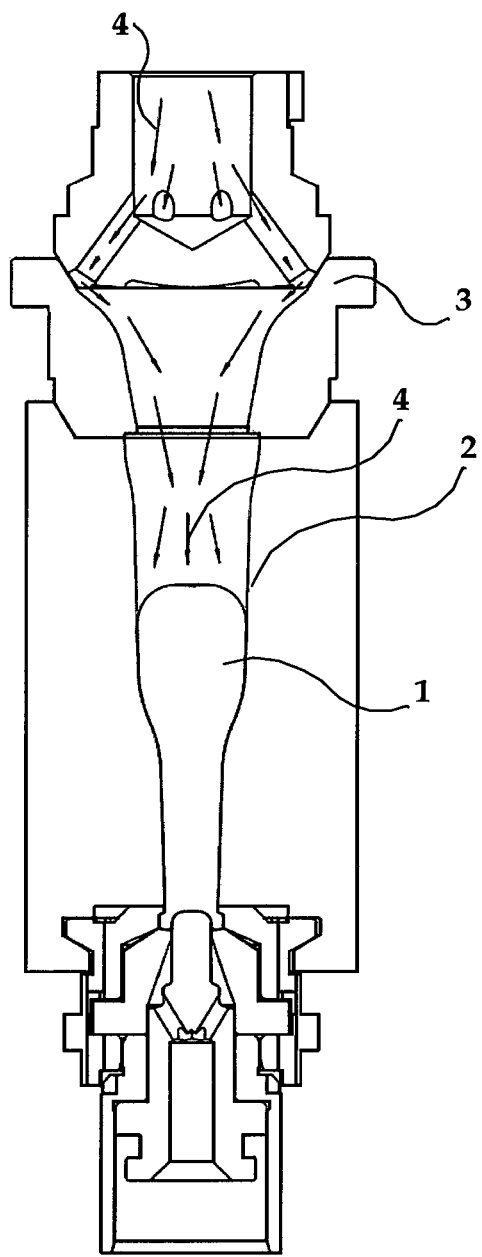
FIGS. 1 to 4 show a blow-and-blow process for the production of glass containers and relate to prior art.
Figure 2:
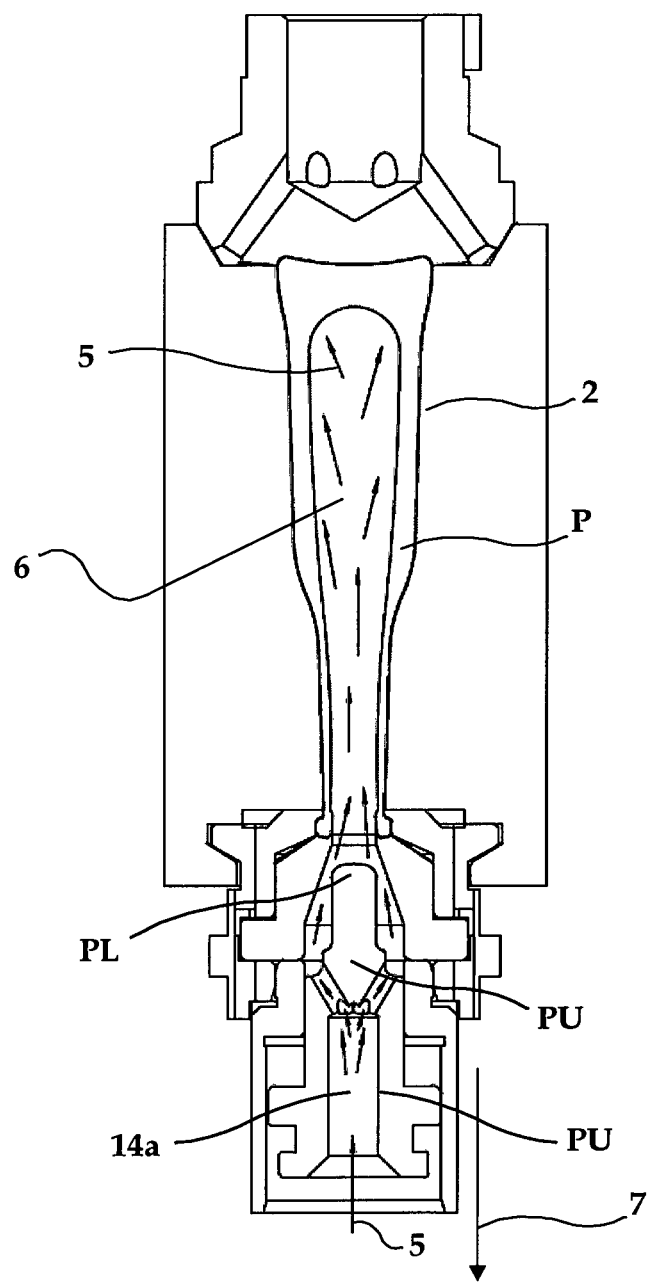
Figure 3:
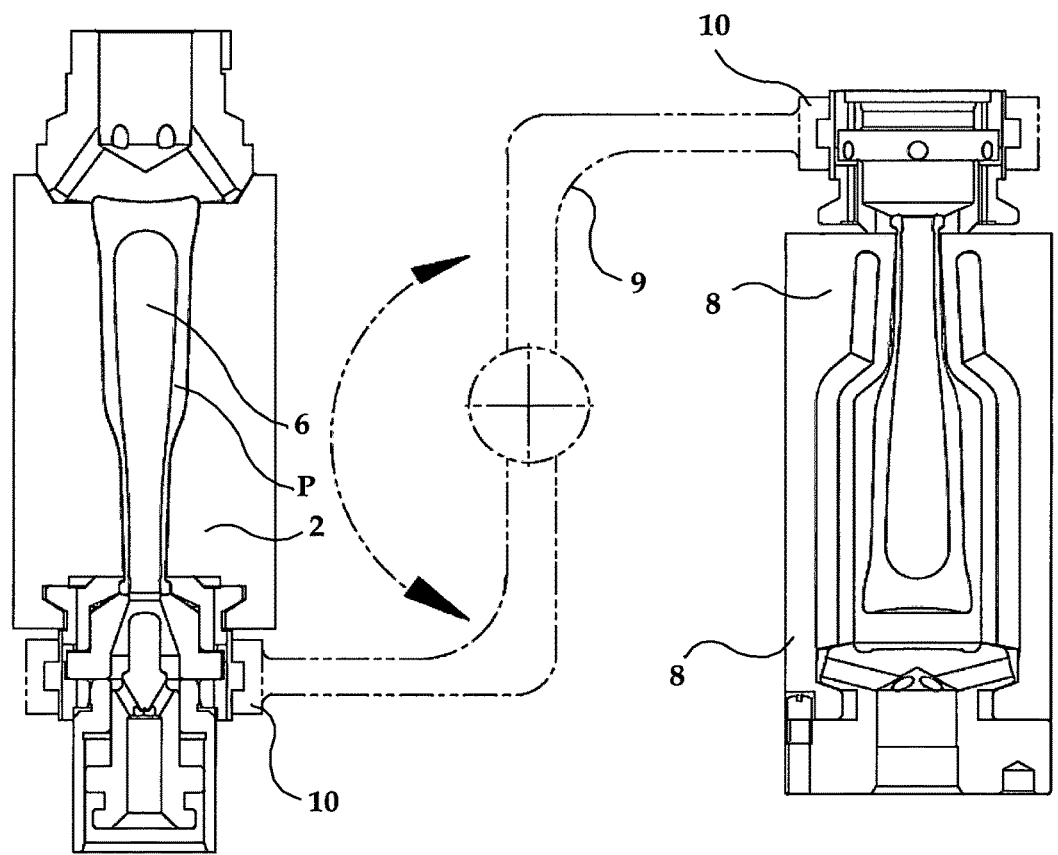

FIGS. 1 to 4 show a blow-and-blow process for the production of glass containers and relate to prior art. First a gob 1 is cut from the glass melt in the furnace via a feeder and fed via a delivery system to a blank mold 2 in which a solid body with a certain cavity is formed in accordance with the weight and the bottle shape finally targeted later. This generally happens by virtue of the fact that the gob 1 from the glass melt firstly slides via the abovementioned delivery system 3 into the blank mold 2 and is then set or blown downward with pressurized (compressed) air 4 from above against the mold wall whereupon a cavity 6 is blown into the solid gob 1 body by a counterblow 5 from below (via an air channel 14a serving pressurized air for the counter blow 5), as a result of which an upper region of the later glass container, specifically a finish of the later glass container—commonly called parison P—, is already formed in the lower region of the blank mold. This method is denoted as a blow-and-blow process-type.

The counterblow 5 necessary to form the parison P in the blank mold 2—also called a parison mold—is done with compressed air 5 via a plunger unit PU into the gob 1 from underneath after the plunger PL is drawn back a little bit—preferably downward 7—from the gob 1 in the blank mold 2 above.

In case of the abovementioned method, the parisons P thus preformed, which are still unfinished but already have an incipient inner cavity 6, are therefore brought from the blank mold 2 into the finish mold 8, something which can happen by virtue of the fact that a swinging arm 9 that has a finish support 10 gripping the parison P in the region of its finish brings the preformed glass body (the parison P) from the blank mold 2, which is opening for this purpose, into a finish mold 8, which is likewise opening for this purpose, the parison P being rotated by 180° about its horizontal axis, and the finish thus now pointing upward in the finish mold 8. After reheating, if appropriate—this glass body (parison P) is then finally blown—doing so now from above—with compressed air 11, 21 via a blow head BH comprising a blowing passage (air channel) 14b and preferably a tube 19. Said blow head BH is preferably mounted on a blow head support (not shown here). The parison P is blown into its final shape of a glass container 12 in the finish mold 8 whereupon it can be removed after opening of the finish mold 8, preferably by take-out-tongs onto a conveyor belt for further transportation in the product flow process. In a preferred embodiment the final blow 11 process can be supported by a vacuum system 13 that draws the glass container's 12 outer wall in the finish mold station 8. Compressed air may preferably also directed for finish cooling 21 through a finish cooling passage (also [an] air channel[s]) 20 if necessary or if preferred.

Figure 5:
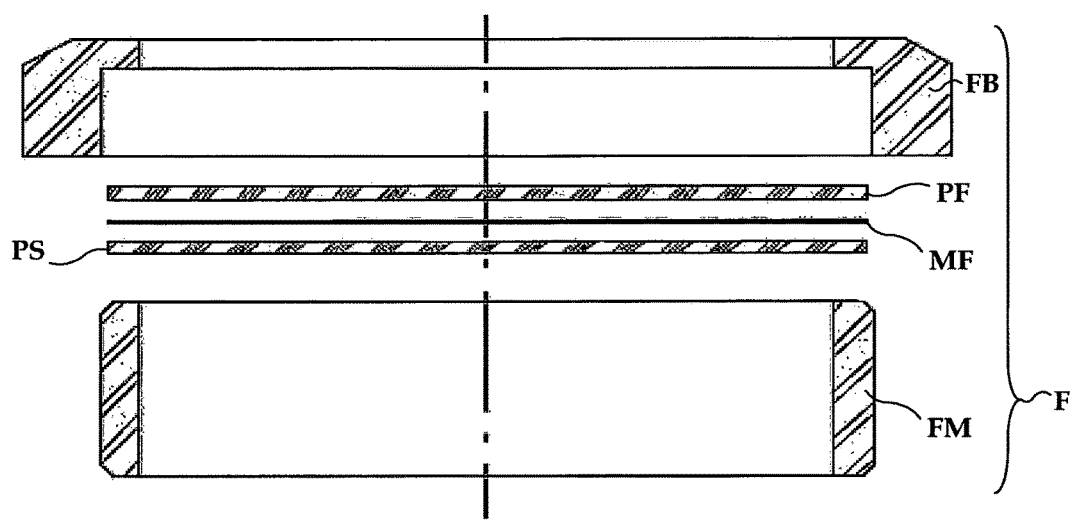
FIG. 5 shows an unmounted particle filter for a glass forming machine according to the present invention in a sectional view.

FIG. 5 shows an unmounted particle filter F for a glass forming machine according to the present invention in a sectional view, wherein a main filter media MF that is situated between a protective filter media PF and a porous support mean PS is held together with said protective filter media PF and said porous support mean PS by a filter body FB and a fastening mean FM, preferably an insert mean that is adapted to—preferably connected with—said filter body FB, preferably inserted into said filter body FB with interference fit to said filter body FB.

Figure 6:
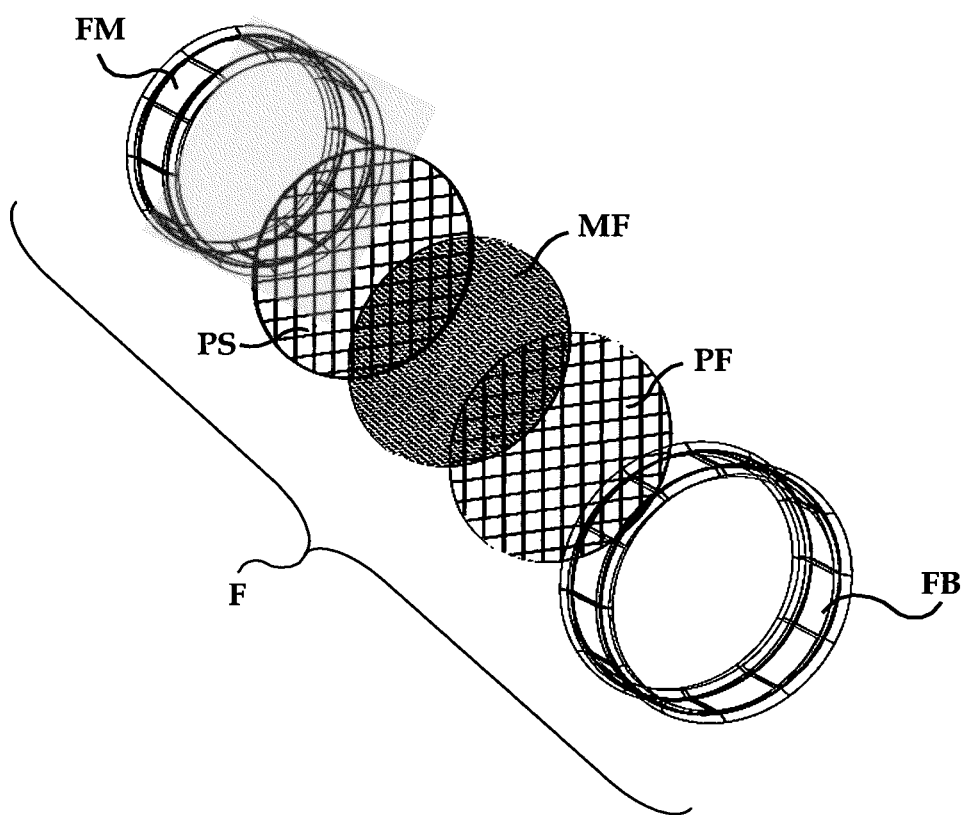
FIG. 6 shows also an unmounted particle filter for a glass forming machine according to the present invention, but in an perspective view.

FIG. 6 shows also an unmounted particle filter F for a glass forming machine according to the present invention, but in an perspective view, wherein a main filter media MF (a wire mesh with small pores) that is situated between a protective filter media PF (also a wire mesh, but more coarse than the wire mesh of said main filter media MF, meaning that the pores of mesh of the protective filter media PF are bigger than the pores of the main filter media MF) and a porous support mean PS (also a wire mesh, but more coarse than the wire mesh of said main filter media MF, meaning that the pores of mesh of the support mean PS are bigger than the pores of the main filter media MF) is held together with said protective filter media PF and said support mean PS by a filter body FB and a fastening mean FM, preferably an insert mean that is adapted to—preferably connected with—said filter body FB, here to be inserted into said filter body FB with interference fit to said filter body FB.

Figure 7:
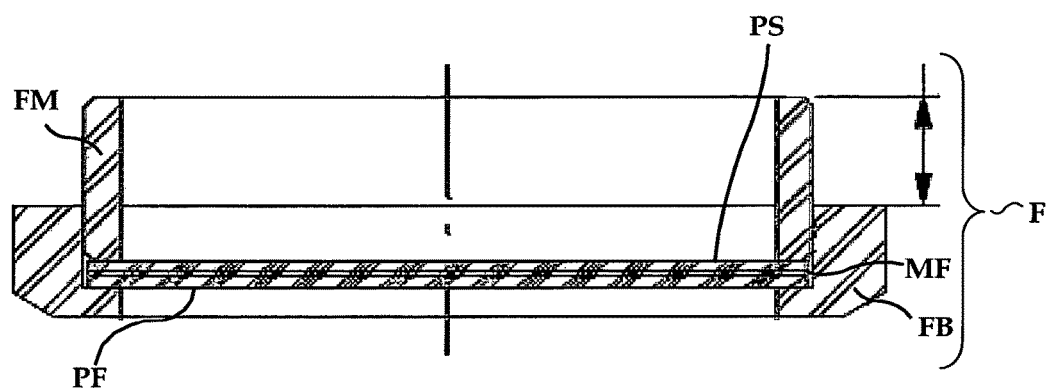
FIG. 7 shows a mounted particle filter for a glass forming machine according to the present invention in a sectional view.

FIG. 7 shows a mounted particle filter F for a glass forming machine according to the present invention in a sectional view, wherein a main filter media MF that is situated between a protective filter media PF and a porous support mean PS is held together with said protective filter media PF and said porous support mean PS by a filter body FB and a fastening mean FM, preferably an insert mean that is adapted to—preferably connected with—said filter body FB, preferably inserted into said filter body FB with interference fit to said filter body FB. The outer dimension (here the outer dimension) of said filter body FB overlaps the outer dimension (here the outer diameter) of said fastening mean FM, preferably a press ring. Such an embodiment of a particle filter according to the present invention is able to be used in an air channel 14*a*, 14*b*, 20 only in a proper position—preferably in one orientation or direction—. This is due to the fact of its geometry, if the respective air channel 14*a*, 14*b*, 20 is adapted to said geometry of said particle filter F. Such an embodiment allows for safety reasons to avoid a wrong assembly of a particle filter F in a glass forming machine, preferably in a plunger unit PU and/or a blow head BH and/or a blow head support. I.e. the wrong assembly of an already used particle filter could be harmful to parisons P or glass containers 12 to be blown (formed) by the glass forming machine because in such a case the particles formerly collected on the dirty side of the particle filter F may turn to the clean side and will be blown from there into the parison P and/or the final glass container 12, a situation that should be avoided.

Figure 8:
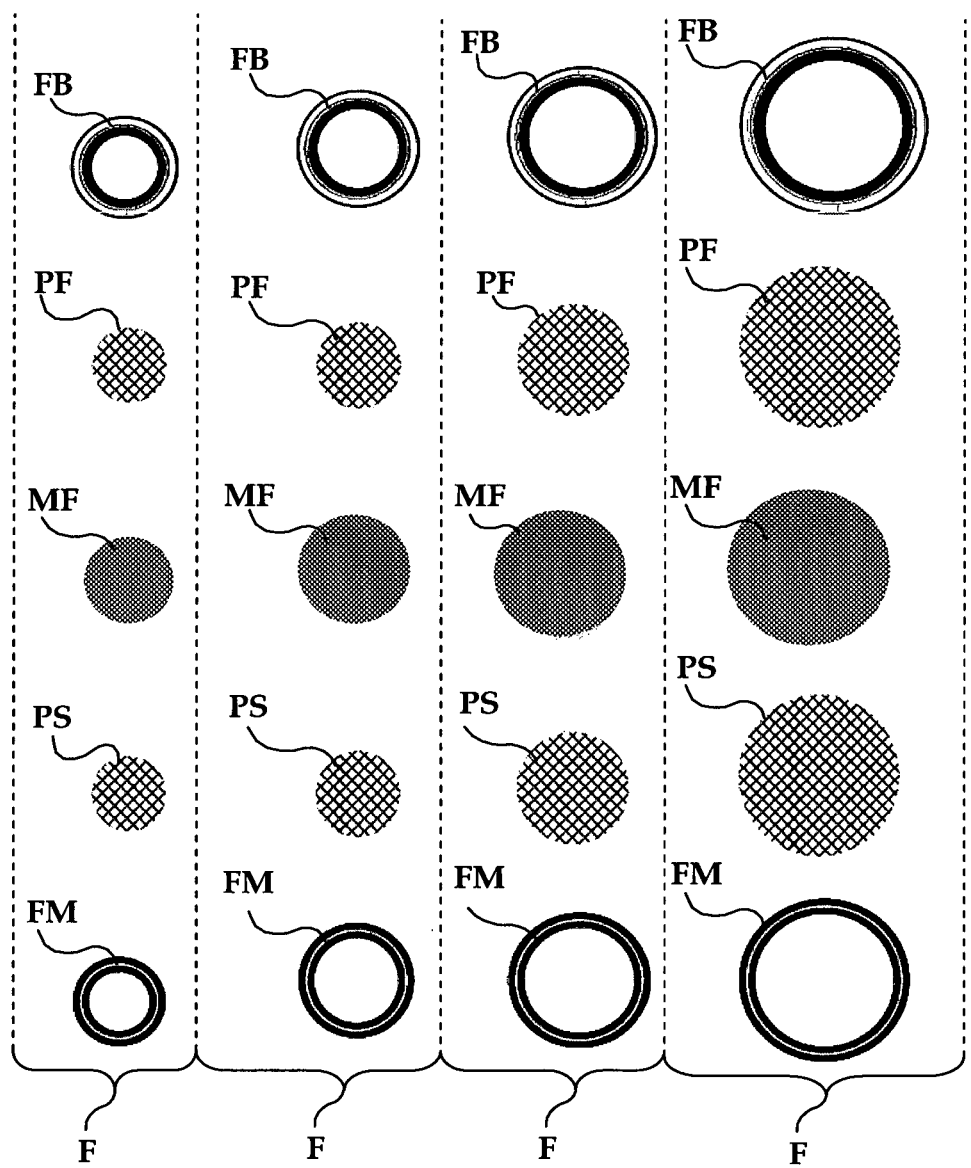
FIG. 8 shows a set of four unmounted particle filters of different sizes for a glass forming machine according to the present invention with parts of it as a circular disc or ring shown in an bird's eye view on the surface of said discs or rings.

FIG. 8 shows a set of four unmounted particle filters F of different sizes for a glass forming machine according to the present invention with parts of it as a circular disc or ring shown in an bird's eye view on the surface of said discs or rings, wherein a main filter media wire mesh disc MF that has to be positioned between a protective filter media wire mesh disc PF and a support mean wire mesh disc PS should be held together with said protective filter media wire mesh disc PF and said support mean wire mesh disc PS by a filter body ring FB and a fastening mean, here a press ring FM, if the press ring FM is inserted into said filter body ring FB with interference fit to said filter body ring FB. Preferably the outer diameter of the filter body ring FB of the smallest particle filter shown here (in the very left column) is 0.6 inches that is 15.24 mm, the outer diameter of the filter body ring FB of the next particle filter shown in the next column to the right is preferably 0.75 inches that is 19.05 mm, the next one is preferably 0.9 inches that is 22.86 mm and the last one (in the very right column) is preferably 1.2 inches that is 30.48 mm.

| | Press Ring (as fastening mean FM) | | | |
|---|---|---|---|---|
| Filter# | PR-O (inches) (mm) | PR-I (inches) (mm) | PR-H (inches) (mm) | PR-CH (deg inches) (deg mm) |
| CH#-1.200 | 1.000" +/− 0.001" / 25.4 mm +/− 0.0254 mm | 0.900" / 22.86 mm | 0.234" / 5.9436 mm | 45° 0.015" / 45° 0.381 mm |
| CH#-0.925 | 0.750" +/− 0.001" / 19.05 mm +/− 0.0254 mm | 0.660" / 16.764 mm | 0.234" / 5.9436 mm | 45° 0.015" / 45° 0.381 mm |
| CH#-0.750 | 0.653" +/− 0.001" / 16.5862 mm +/− 0.0254 mm | 0.530" / 13.462 mm | 0.234" / 5.9436 mm | 45° 0.015" / 45° 0.381 mm |

| | Disc (as protective filter media PF, as main filter media MF and as porous support mean PS) | | |
|---|---|---|---|
| Filter# | D-C (inches) (mm) | D-F (inches) (mm) | D-D (inches) (mm) |
| CH#-1.200 | 0.985" +/− 0.003" / 25.019 mm +/− 0.0762 mm | 0.985" +/− 0.003" / 25.019 mm +/− 0.0762 mm | 0.985" +/− 0.003" / 25.019 mm +/− 0.0762 mm |
| CH#-0.925 | 0.735" +/− 0.003" / 18.669 mm +/− 0.0762 mm | 0.735" +/− 0.003" / 18.669 mm +/− 0.0762 mm | 0.735" +/− 0.003" / 18.669 mm +/− 0.0762 mm |

-continued

| | Disc (as protective filter media PF, as main filter media MF and as porous support mean PS) | | |
|---|---|---|---|
| Filter# | D-C (inches) / (mm) | D-F (inches) / (mm) | D-D (inches) / (mm) |
| CH#-0.750 | 0.625″ +/− 0.001″ / 15.875 mm +/− 0.0762 mm | 0.625″ +/− 0.001″ / 15.875 mm +/− 0.0762 mm | 0.625″ +/− 0.001″ / 15.875 mm +/− 0.0762 mm |

| | Filter Body FB | | | | | |
|---|---|---|---|---|---|---|
| Filter# | FB-O (inch)/(mm) | FB-I (inch)/(mm) | FB-H (inch)/(mm) | FB-IH (inch)/(mm) | FB-B (inch)/(mm) | FB-CH (deg inch)/(deg mm) |
| CH#-1.200 | 1.200″ / 30.48 mm | 0.997″ +/− 0.001″ / 25.3238 mm +/− 0.0254 mm | 0.160″ +/− 0.002″ / 4.046 mm +/− 0.0508 mm | 0.118″ / 2.9972 mm | 0.900″ / 22.86 mm | 30° 0.060″ / 30° 1.542 mm |
| CH#-0.925 | 0.925″ / 23.495 mm | 0.747″ +/− 0.001″ / 18.9738 mm +/− 0.0254 mm | 0.160″ +/− 0.002″ / 4.064 mm +/− 0.0508 mm | 0.118″ / 2.9972 mm | 0.625″ / 15.875 mm | 30° 0.060″ / 30° 1.542 mm |
| CH#-0.750 | 0.750″ / 1905 mm | 0.650″ +/− 0.001″ / 16.51 mm +/− 0.0254 mm | 0.160″ +/− 0.002″ / 4.064 mm +/− 0.0508 mm | 0.118″ / 2.9972 mm | 0.450″ / 11.43 mm | 30° 0.060″ / 30° 1.542 mm |

Figure 9:
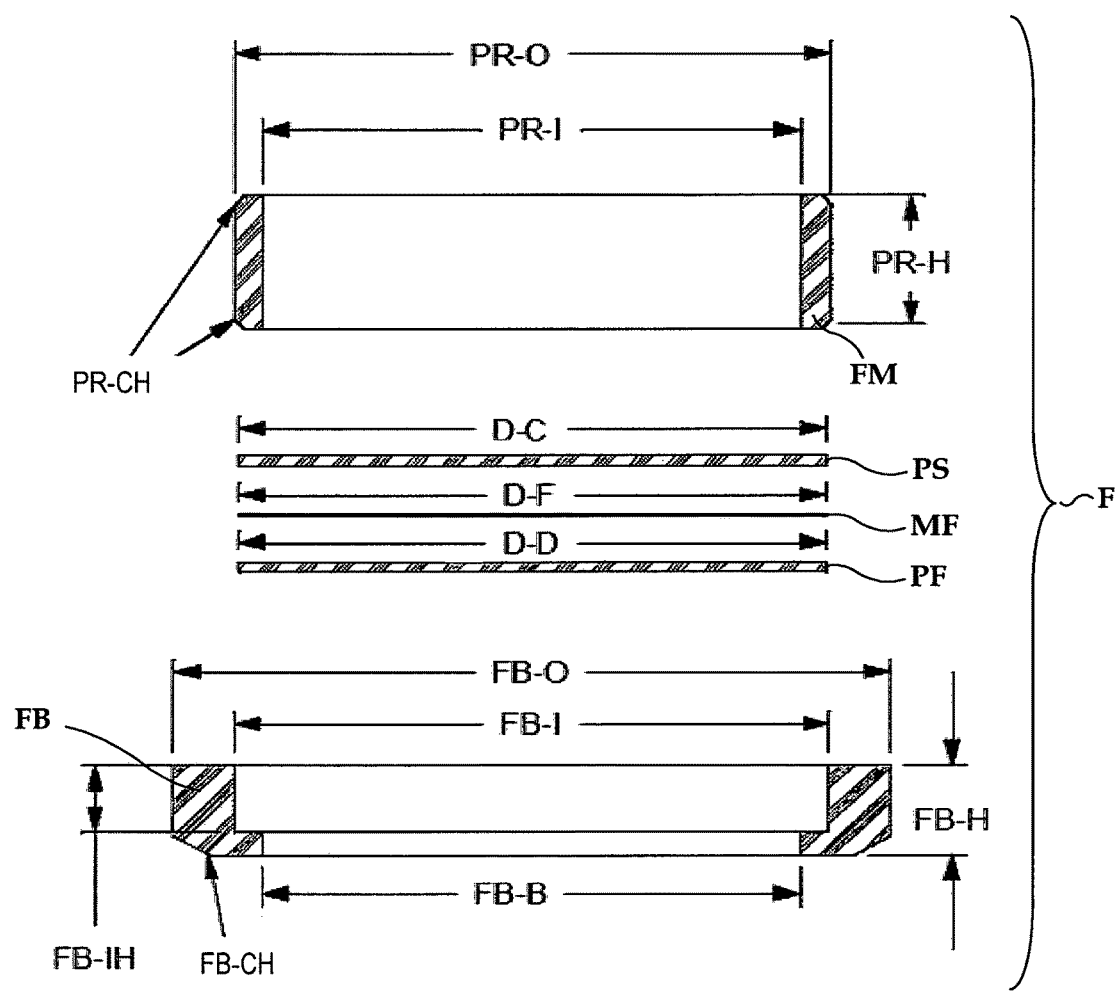
FIG. 9 shows an unmounted particle filter according to the present invention with preferred dimensional specification parameters of three preferred embodiments.

FIG. 9 shows an unmounted particle filter F according to the present invention with preferred dimensional specification parameters of three preferred embodiments, wherein (of course in an respective mounted embodiment of the filter F) a main filter media MF that is situated between a protective filter media PF and a porous support mean PS is held together with said protective filter media PF and said porous support mean PS by a filter body FB and a fastening mean FM, preferably an insert mean, most preferably a press ring that is adapted to—preferably connected with—said filter body FB, preferably inserted into said filter body FB with interference fit to said filter body FB as follows:

Break all sharp edges 45° 0.015″ that is 45° 0,381 mm. Tolerances +/−0.003″ that is 0.0762 mm on all but marked dimensions. The values in inches are the original values and a conversion relation was used wherein 1″ (1 inch) is 2.54 cm.

Figure 10:
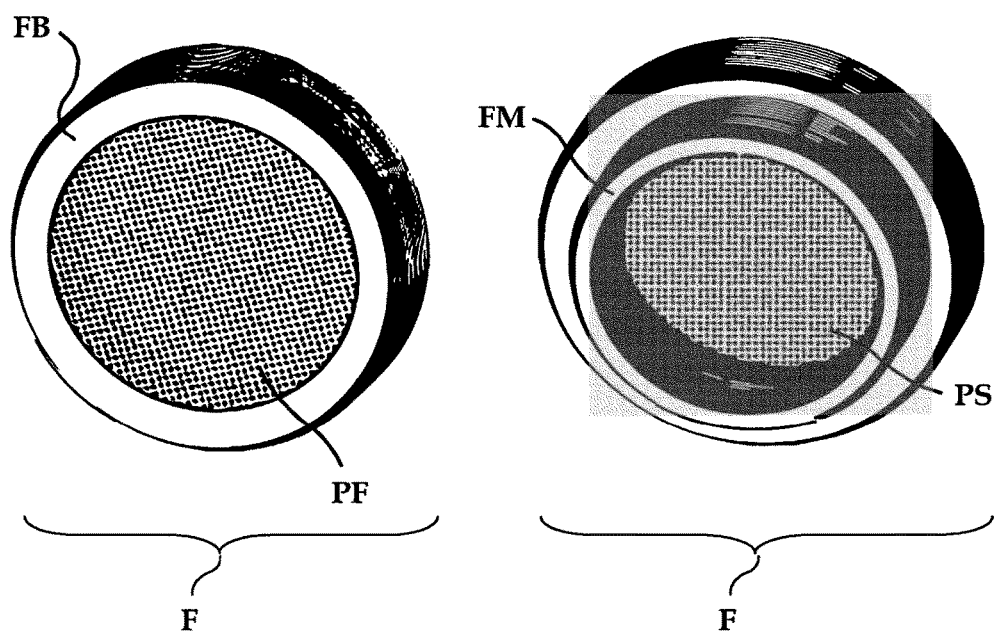
FIG. 10 shows a mounted particle filter according to the present invention in a perspective view on the left side from its intentional clean side and on the right side from its intentional dirty side.

FIG. 10 shows a mounted particle filter F according to the present invention in a perspective view on the left side from its intentional clean side and on the right side from its intentional dirty side wherein a main filter media is situated between a protective filter media wire mesh disc PF and a porous support mean wire mesh disc PS held together with said protective filter media wire mesh disc PF and said support mean wire mesh disc PS by a filter bodyring FB and a press ring FM inserted into said filter body ring FB with interference fit to said filter body ring FB. According to its geometry (the filter body ring FB has a larger outer diameter than the press ring FM and thus the outer diameter of said filter body ring FB overlaps the outer diameter of said press ring FM) the particle filter F can be positioned in an air channel 14a, 14b, 20 only in a proper position (preferably a certain orientation or certain direction), if the air channel 14a, 14b, 20 is adapted to the particle filter F in its geometry. Thus, a wrong assembly of the particle filter F according to the present invention can be avoided.

Figure 11:
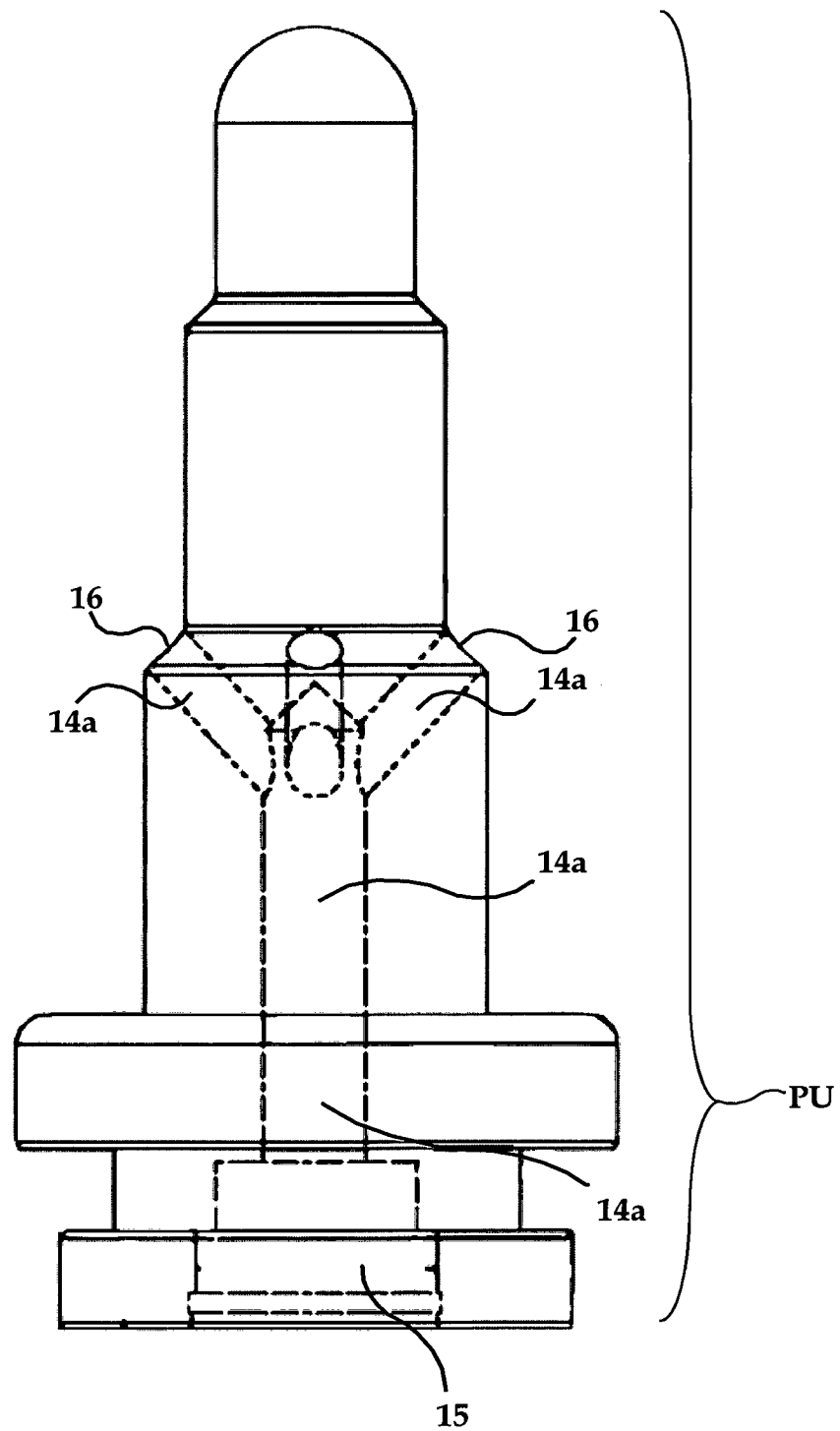
FIG. 11 shows a sectional view of a plunger unit according to the present invention comprising at least an air channel for counter blow of a parison.

FIG. 11 shows a sectional view of a plunger unit PU according to the present invention comprising at least an air channel 14a for counter blow 5 of a parison P and said plunger unit PU suitable for placement in a plunger cylinder underneath a blank mold 2 forming station of a glass forming machine of a blow-and-blow process-type or a press-and-blow process-type, preferably an I.S. glass machine, said plunger unit PU adapted to receive a particle filter F according to the present invention and said particle filter F to be placed in at least said air channel 14a of said plunger unit PU adapted to said particle filter. Here the plunger unit PU is adapted to the particle filter F in an insert area 15 at the lower end of the air channel 14a that leads to the outlets 16 through the pressurized air flows into the parison's P inner cavity 6 as counter blow 5.

Figure 12:
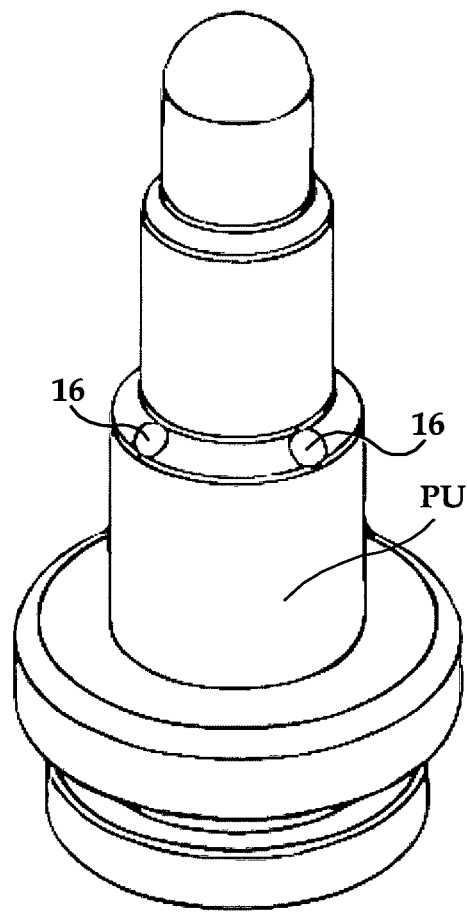
FIG. 12 shows a perspective view of a plunger unit according to the present invention showing the outlets through the pressurized air flows into the par-son's inner cavity as counter blow.

FIG. 12 shows a perspective view of a plunger unit PU according to the present invention showing the outlets 16 through the pressurized air flows into the parison's P inner cavity 6 as counter blow 5.

Figure 13:
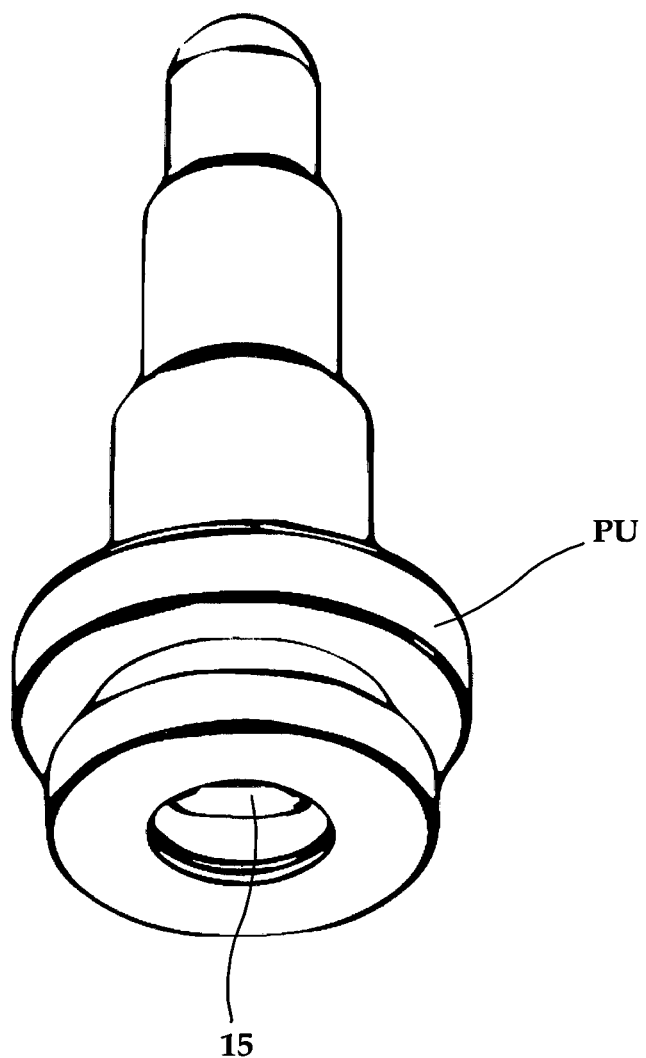
FIG. 13 shows a perspective view of a plunger unit according to the present invention from downside.

FIG. 13 shows a perspective view of a plunger unit PU according to the present invention from downside. As already disclosed in FIG. 11 the plunger unit PU is adapted to the particle filter F in an insert area 15 at the lower end of the air channel 14a that leads to the outlets 16 through the pressurized air flows into the parison's P inner cavity 6 as counter blow 5.

Figure 14:
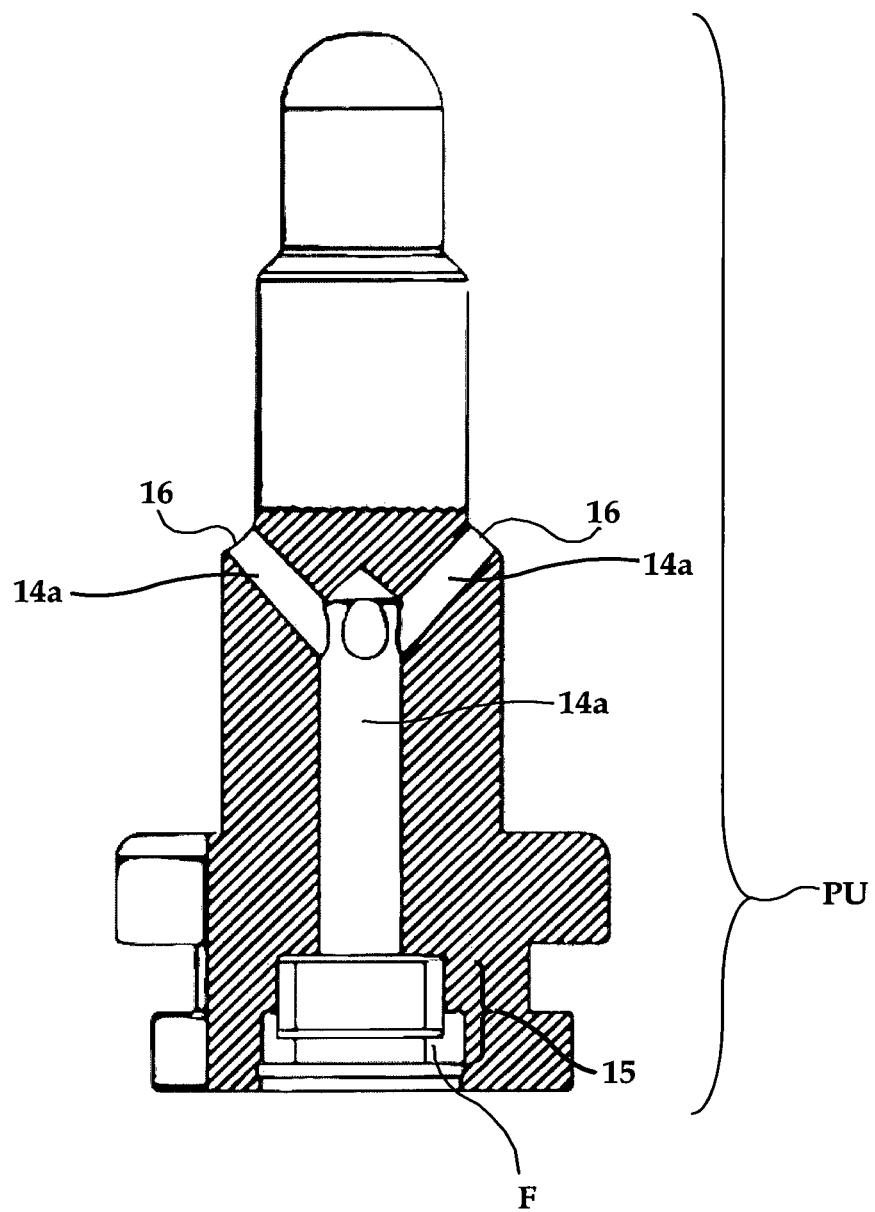
FIG. 14 shows a partly sectional view of a plunger unit according to the present invention comprising at least an air channel with a particle filter already placed in at least said air channel.

FIG. 14 shows a partly sectional view of a plunger unit PU according to the present invention comprising at least an air channel 14a for counter blow 5 of a parison P and said plunger unit PU suitable for placement in a plunger cylinder underneath a blank mold 2 forming station of a glass forming machine of a blow-and-blow process-type or a press-and-blow process-type, preferably an I.S. glass machine, said plunger unit PU adapted to receive a particle filter F according to the present invention and said particle filter F already placed in at least said air channel 14a of said plunger unit PU adapted to said particle filter F. Here the plunger unit PU is adapted to the particle filter F in an insert area 15 at the lower end of the air channel 14a that leads to the outlets 16 through the pressurized air flows into the parison's P inner cavity 6 as counter blow 5.

Figure 15:
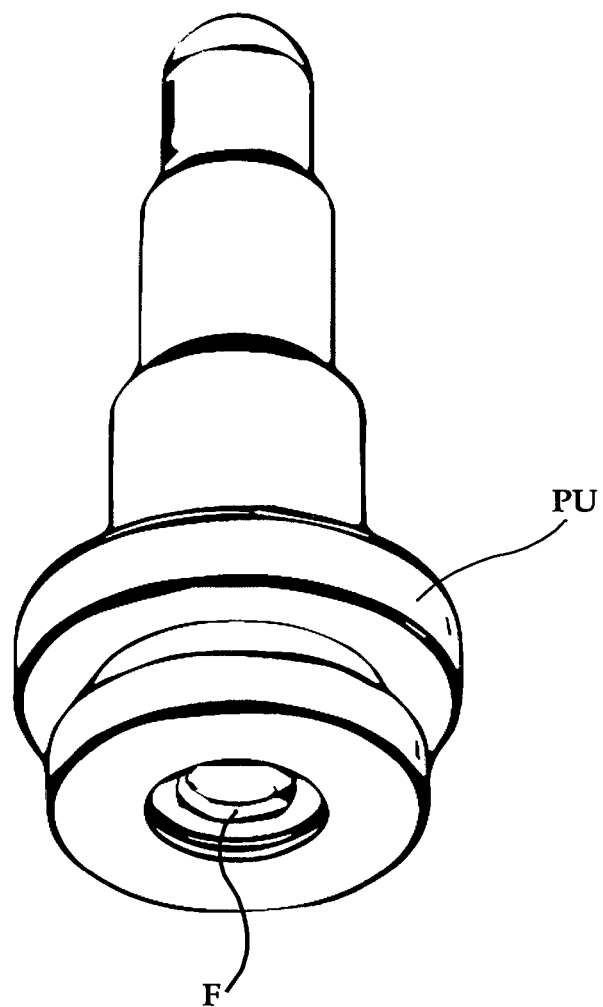
FIG. 15 shows a perspective view of a plunger unit according to the present invention comprising at least an air channel with a particle filter already placed in said air channel.

FIG. 15 shows a perspective view of a plunger unit PU according to the present invention comprising at least an air channel 14a with a particle filter F already placed in at least said air channel 14a.

Figure 16:
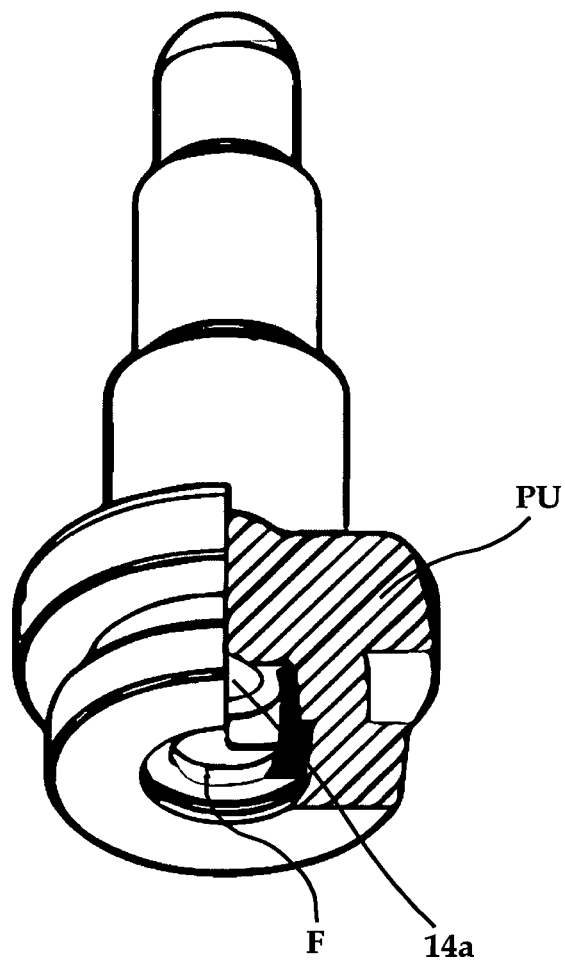
FIG. 16 shows a perspective view of a plunger unit according to the present invention partially opened comprising at least an air channel with a particle filter already placed in said air channel.

FIG. 16 shows a perspective view of a plunger unit PU according to the present invention partially opened and comprising at least an air channel 14a and a particle filter F already placed in at least said air channel 14a.

Figure 17:
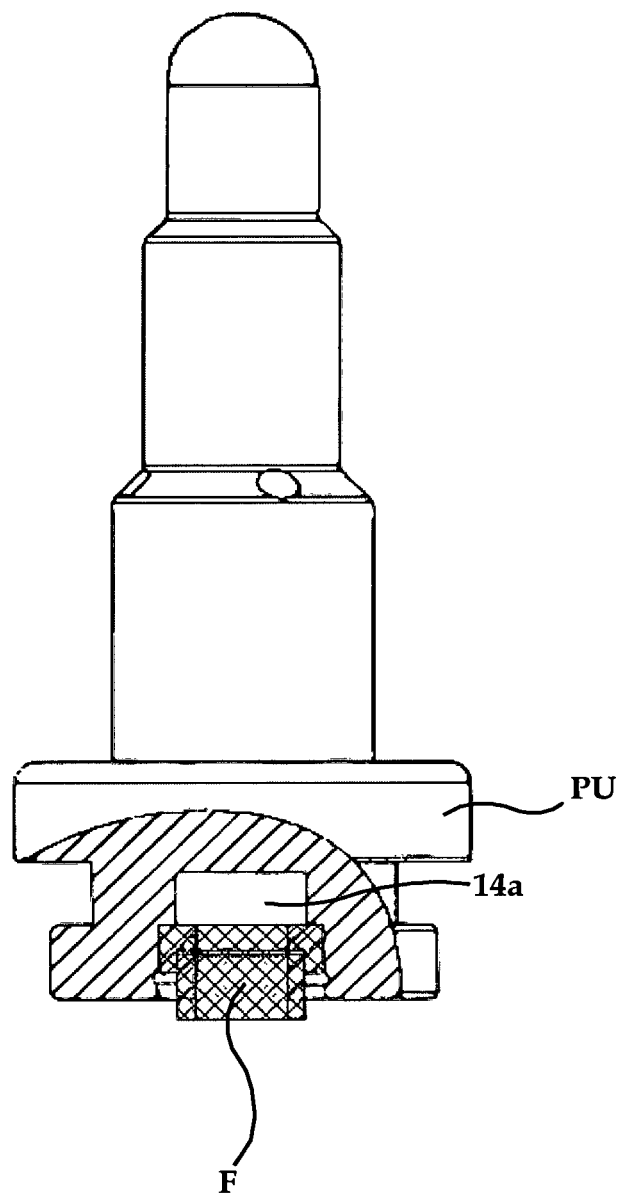
FIG. 17 shows a partly sectional view of a plunger unit according to the present invention comprising at least an air channel with a particle filter already placed, but wrongly placed in said air channel.

FIG. 17 shows a partly sectional view of a plunger unit PU according to the present invention comprising at least an air channel 14a with a particle filter F already placed, but wrongly placed in at least said air channel 14a. As a consequence of this improper placement of the particle filter F in the air channel 14a of the plunger unit PU said particle filter F projects beyond said plunger unit PU and thus, the plunger unit PU cannot be installed in the blank mold 2 forming station of the glass forming machine. Therefore a wrong assembly could be avoided effectively using this embodiment of the present invention.

Figure 18:
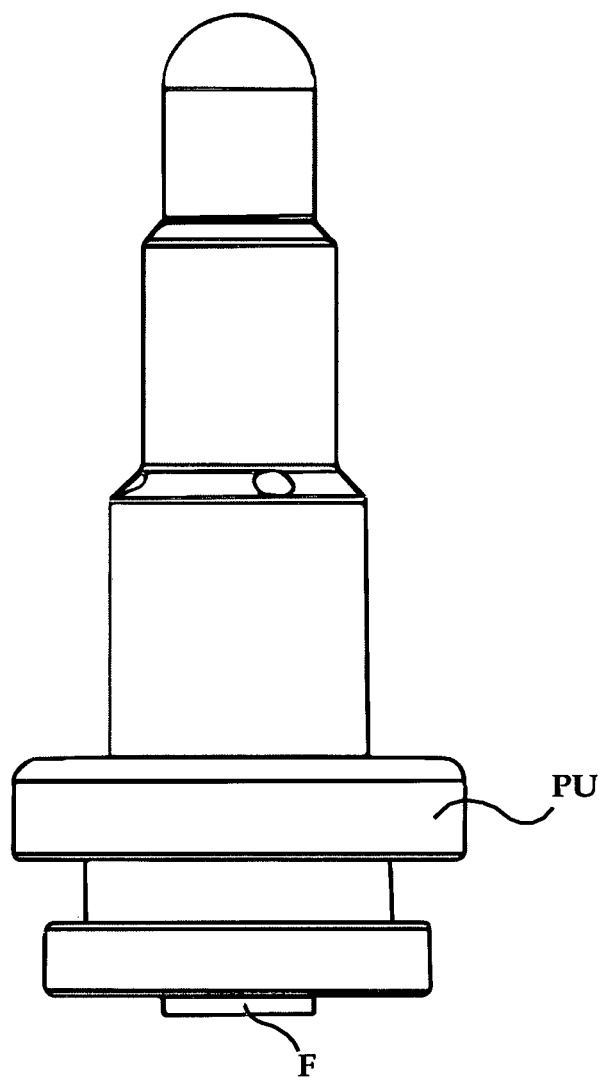
FIG. 18 shows a side view of a plunger unit according to FIG. 17.

FIG. 18 shows a side view of a plunger unit PU according to FIG. 17.

Figure 19:
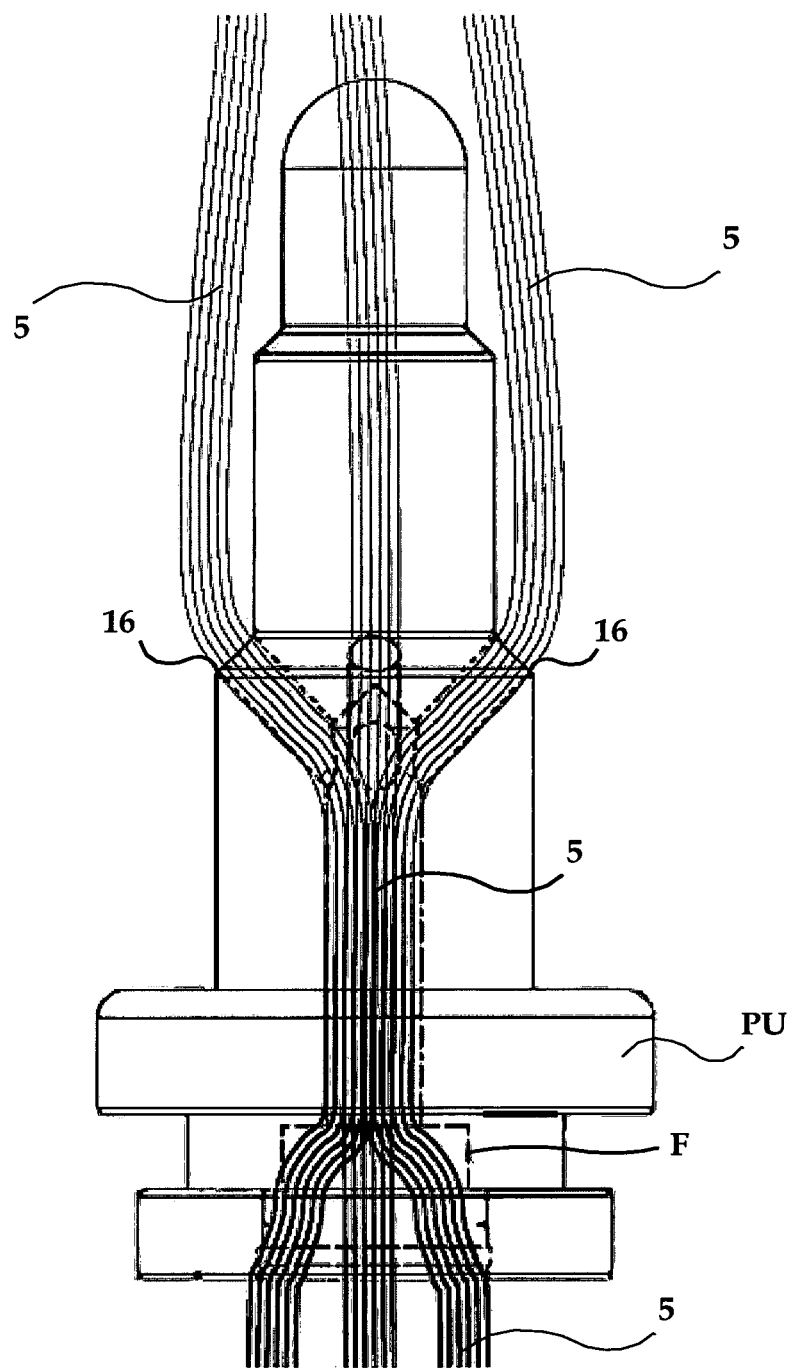
FIG. 19 shows a sectional view of the air flow of a counter blow of a plunger unit according to the present invention.

FIG. 19 shows a sectional view of the air flow of a counter blow 5 in a plunger unit PU according to the present invention. The pressurized air enters the plunger unit PU from downwards passing the particle filter F at the lower end of the air channel 14a that leads to the outlets 16 through the pressurized air flows into the parison's P inner cavity 6 as counter blow 5. By passing the particle filter F according to the present invention undesired particles will be separated and collected on the dirty side (here the downside) of said particle filter F.

Figure 20:
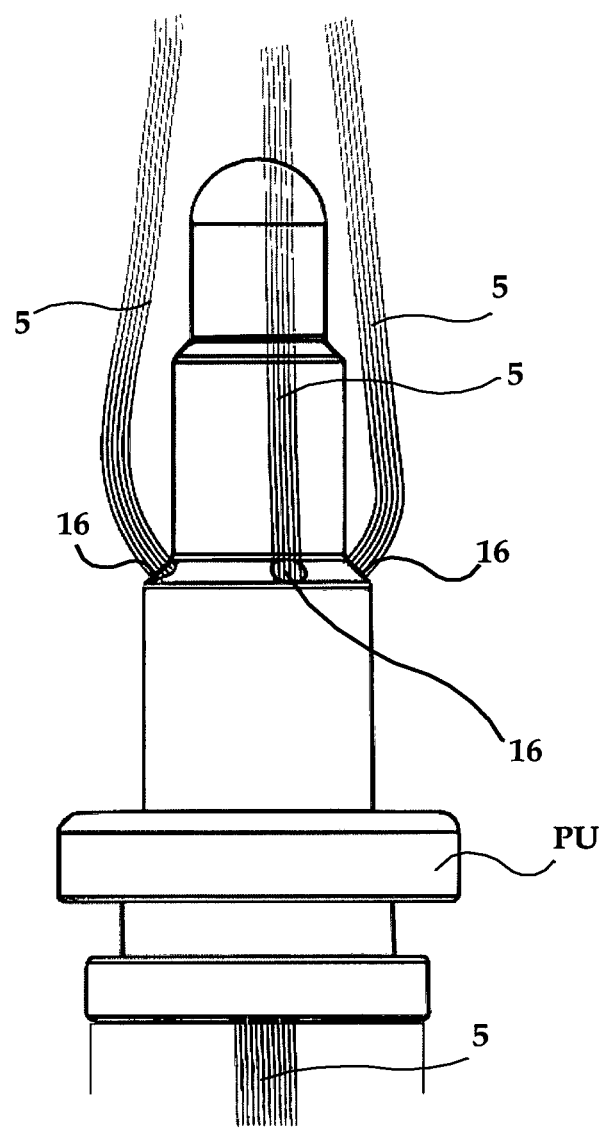
FIG. 20 shows a side view of the air flow of a counter blow of a plunger unit according to FIG. 19.

FIG. 20 shows a side view of the air flow of a counter blow 5 in a plunger unit PU according to FIG. 19.

Figure 21:
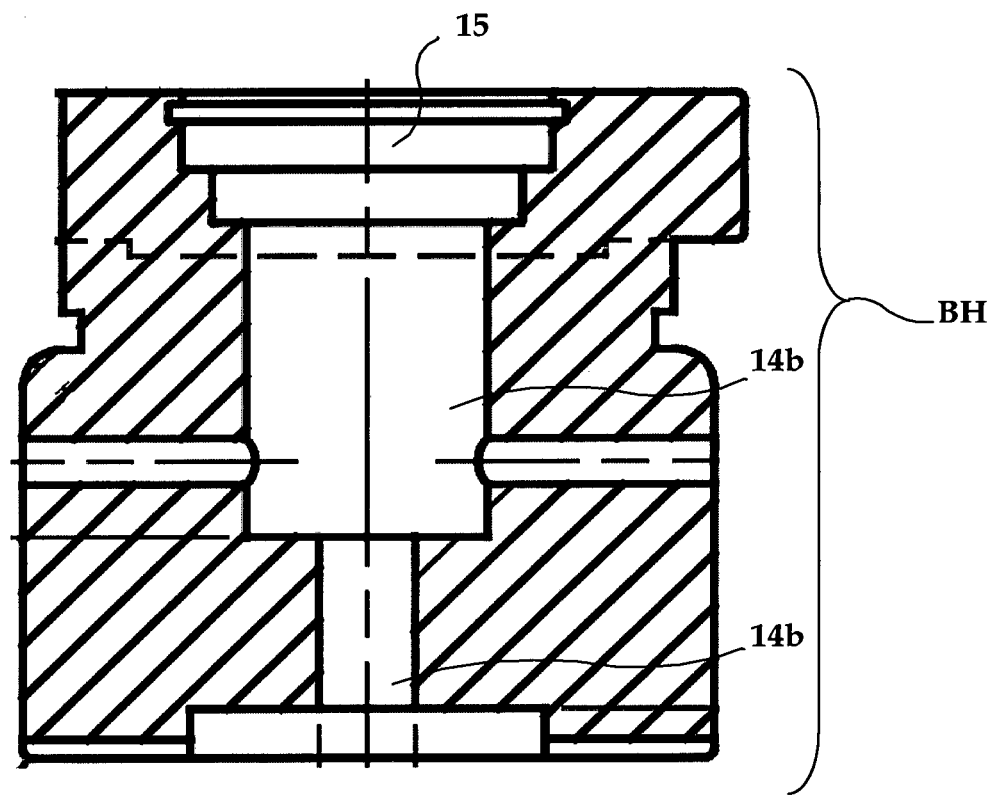
FIG. 21 shows a sectional view of a blow head according to the present invention comprising at least an air channel for final blow of a glass container made of a parison.

FIG. 21 shows a sectional view of a blow head BH according to the present invention comprising at least an air channel 14b for final blow 11 of a glass container 12 made of a parison P and said blow head BH suitable for placement above a finish mold 8 station of a glass forming machine of a blow-and-blow process-type or a press-and-blow process-type, preferably an I.S. glass machine, said blow head BH adapted to receive a particle filter F according to the present invention and said particle filter F to be placed in at least said air channel 14b of said blow head BH adapted to said particle filter F. Here the blow head BH is adapted to the particle filter F in an insert area 15 at the upper end of the air channel 14b that lead to the air inlet of the finish mold 8 through the pressurized air flows into the glass container's 12 inner space as final blow 11.

Figure 4:
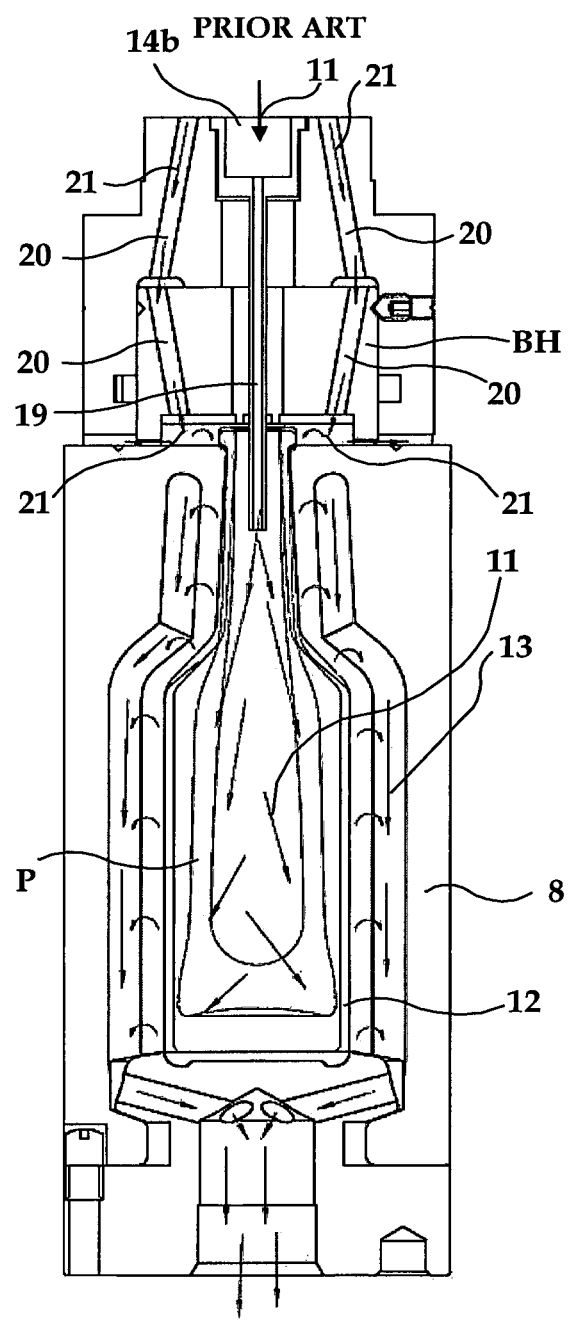

It is also possible—but not shown here—to have a particle filter F according to the present invention of a larger size than shown here that covers not only the air channel 14b for final blow 11 of the glass container 12, but also one or more finish cooling channel(s) 20 for a finish cooling air flow 21 as for example shown in FIG. 4.

Figure 22:
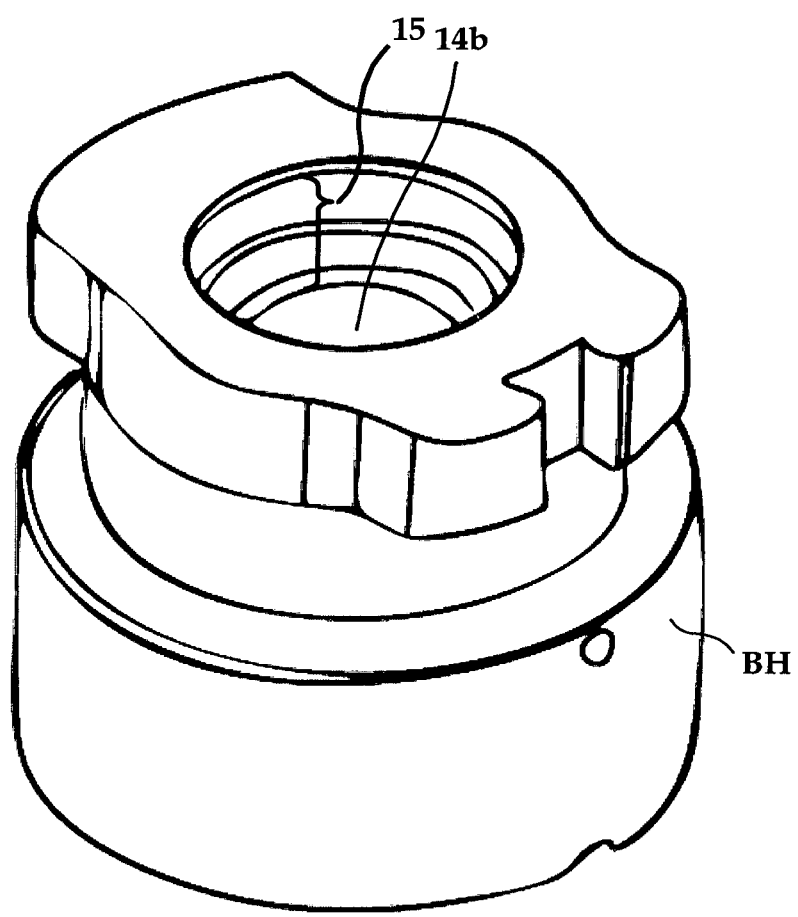
FIG. 22 shows a perspective view of a blow head according to the present invention showing the air channel's insert area that is adapted for insertion of a particle filter according to the present invention from upside.

FIG. 22 shows a perspective view of a blow head BH according to the present invention showing the air channel's 14b insert area 15 that is adapted to the geometry of a particle filter F according to the present invention for insertion of said particle filter F according to the present invention from upside.

Figure 23:
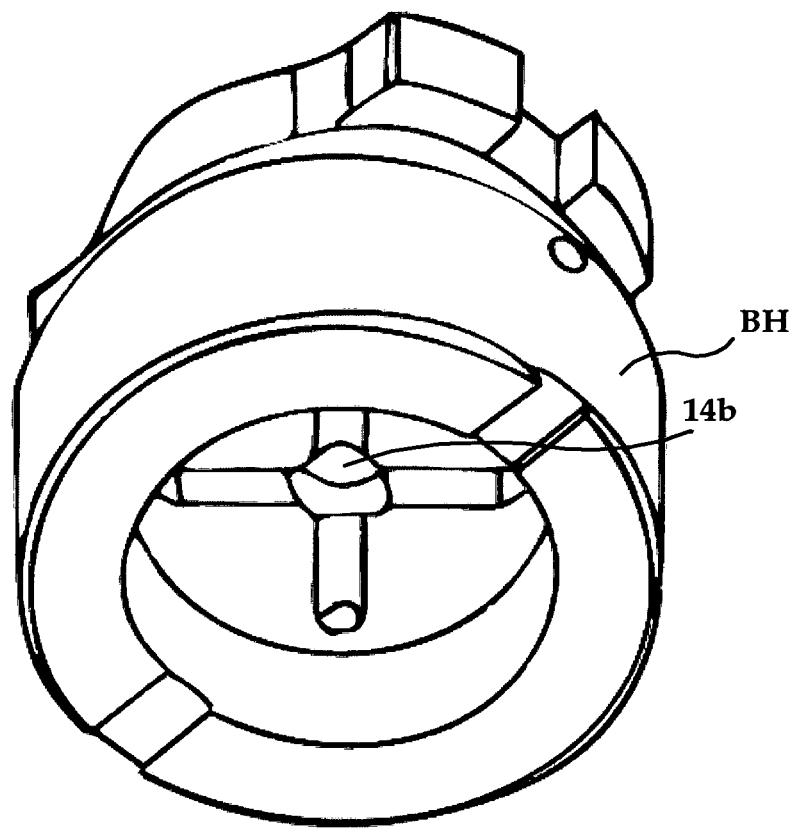
FIG. 23 shows a perspective view of a blow head according to FIG. 22 from downside.

FIG. 23 shows a perspective view of a blow head BH according to FIG. 22 from downside showing the air channel 14b leading to the air inlet of the finish mold 8 through the pressurized air flows into the glass container's 12 inner space as final blow 11.

Figure 24:
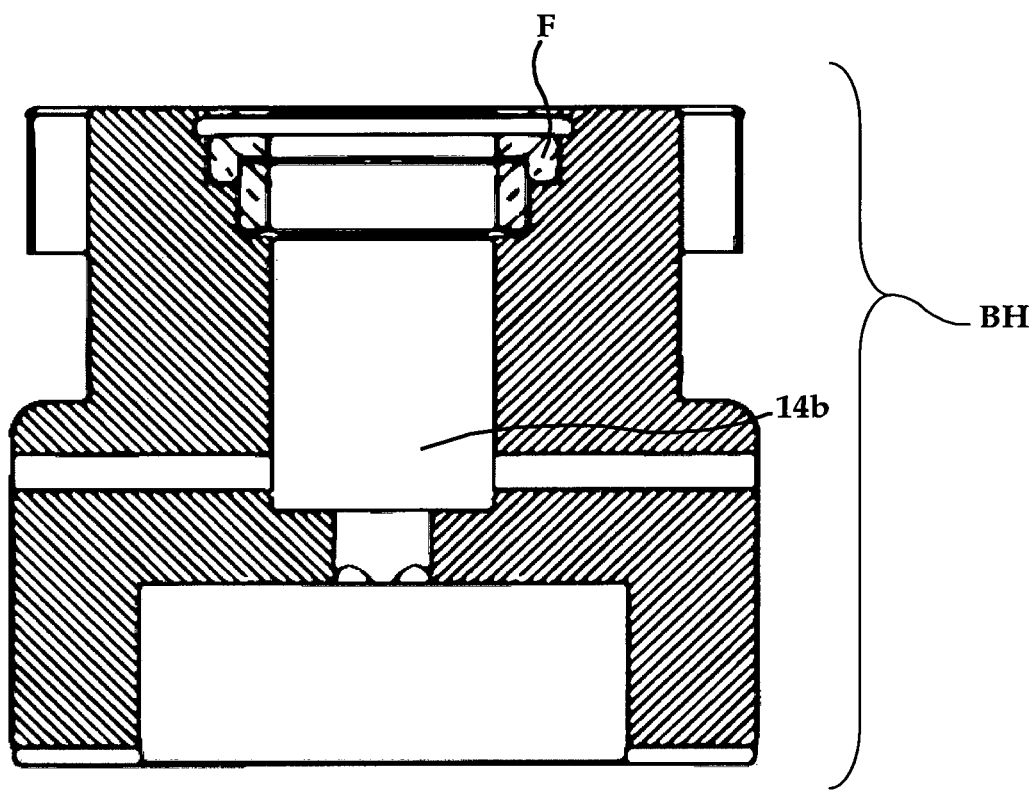
FIG. 24 shows a sectional view of a blow head according to the present invention comprising at least an air channel with a particle filter already placed in at least said air channel.

FIG. 24 shows a sectional view of a blow head BH according to the present invention comprising at least an air channel 14b for final blow 11 of a glass container 12 and said blow head BH suitable for placement above a finish mold 8 station of a glass forming machine of a blow-and-blow process-type or a press-and-blow process-type, preferably an I.S. glass machine, said blow head BH adapted to receive a particle filter F according to the present invention and said particle filter F already placed (inserted here) in at least said air channel 14b of said blow head BH adapted to said particle filter F. Here the blow head BH is adapted to the particle filter F in an insert area 15 at the upper end of the air channel 14b that leads to the air inlet of the finish mold 8 through the pressurized air flows into the glass container's 12 inner space as final blow 11.

Figure 25:
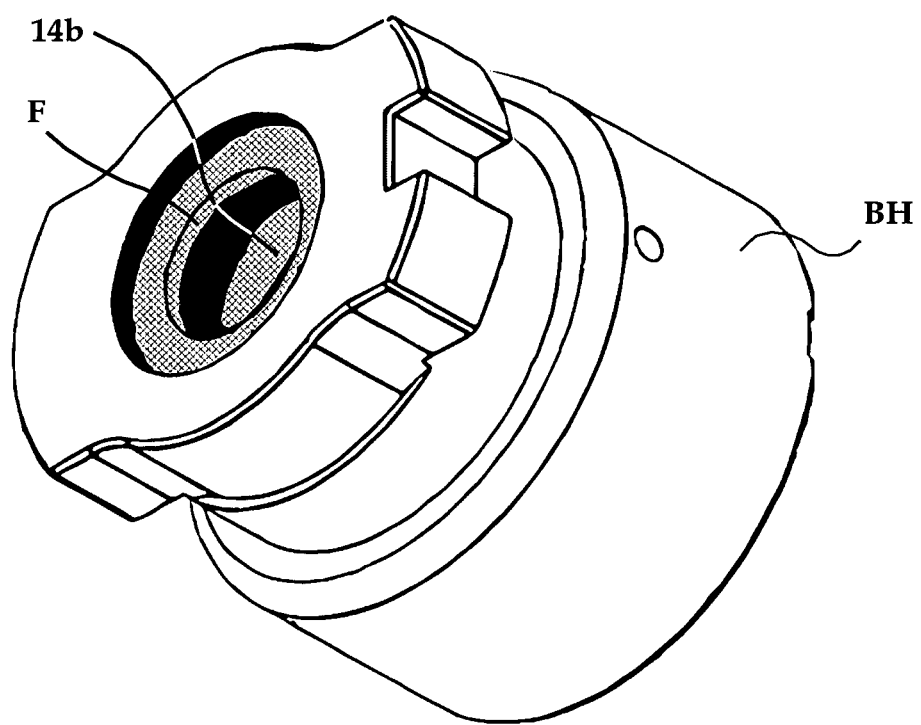
FIG. 25 shows a perspective view of a blow head according to the present invention comprising at least an air channel with a particle filter already placed in at least said air channel.

FIG. 25 shows a perspective view of a blow head BH according to the present invention comprising at least an air channel 14b with a particle filter F already placed in at least said air channel 14b.

Figure 26:
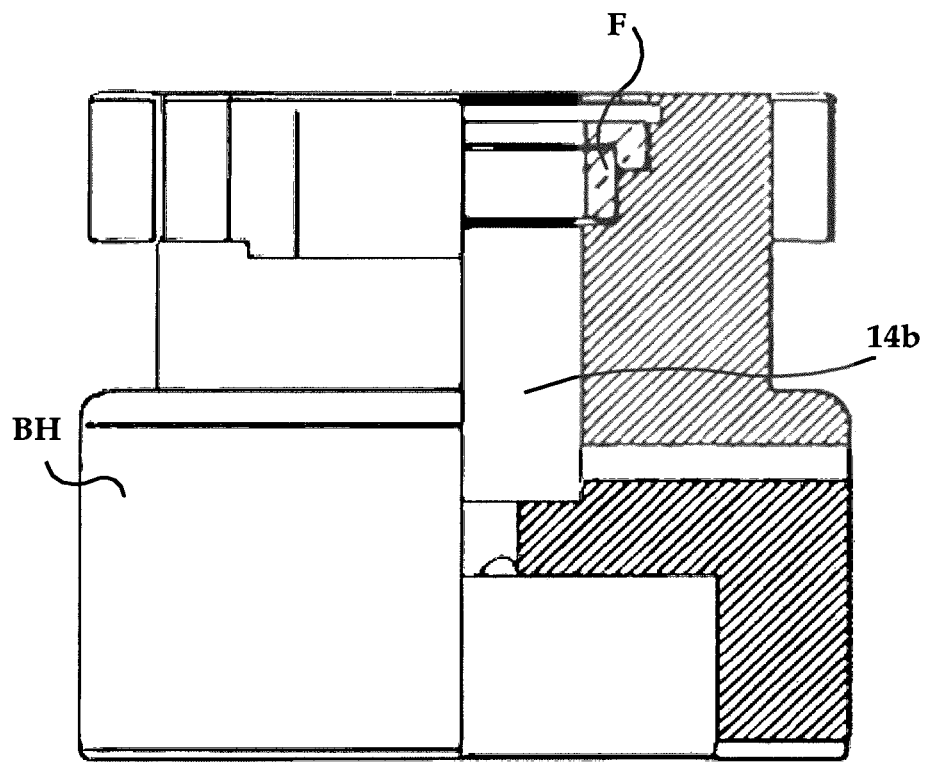
FIG. 26 shows a partly sectional view of a blow head according to the present invention partially opened and comprising at least an air channel with a particle filter already placed in at least said air channel.

FIG. 26 shows a partly sectional view of a blow head BH according to the present invention partially opened and comprising at least an air channel with 14b and a particle filter F already placed in at least said air channel 14b.

Figure 27:
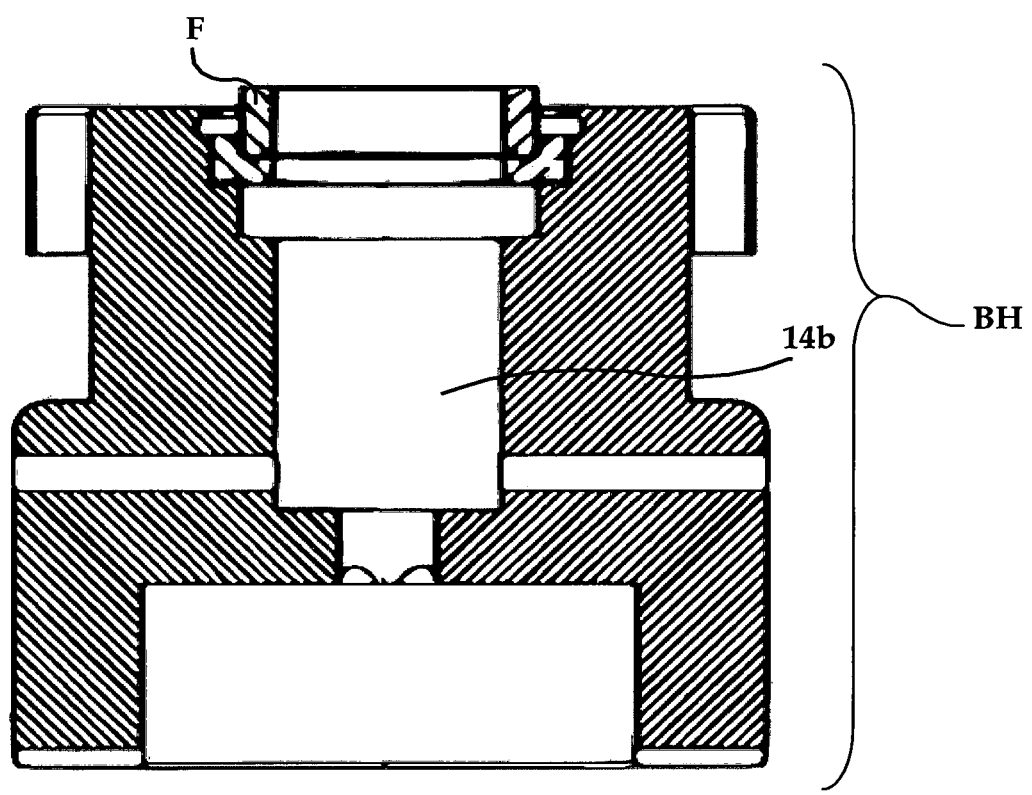
FIG. 27 shows a sectional view of a blow head according to the present invention comprising at least an air channel with a particle filter wrongly placed in at least said air channel.

FIG. 27 shows a sectional view of a blow head BH according to the present invention comprising at least an air channel 14b with a particle filter F already placed, but wrongly placed in at least said air channel 14b. As a consequence of this improperly placement of the particle filter F in the air channel 14b of the blow head BH said particle filter F projects beyond said blow head BH and thus, the blow head BH cannot be installed in the finish mold 8 forming station of the glass forming machine. Therefore a faulty assembly could be avoided effectively using this embodiment of the present invention.

Figure 28:
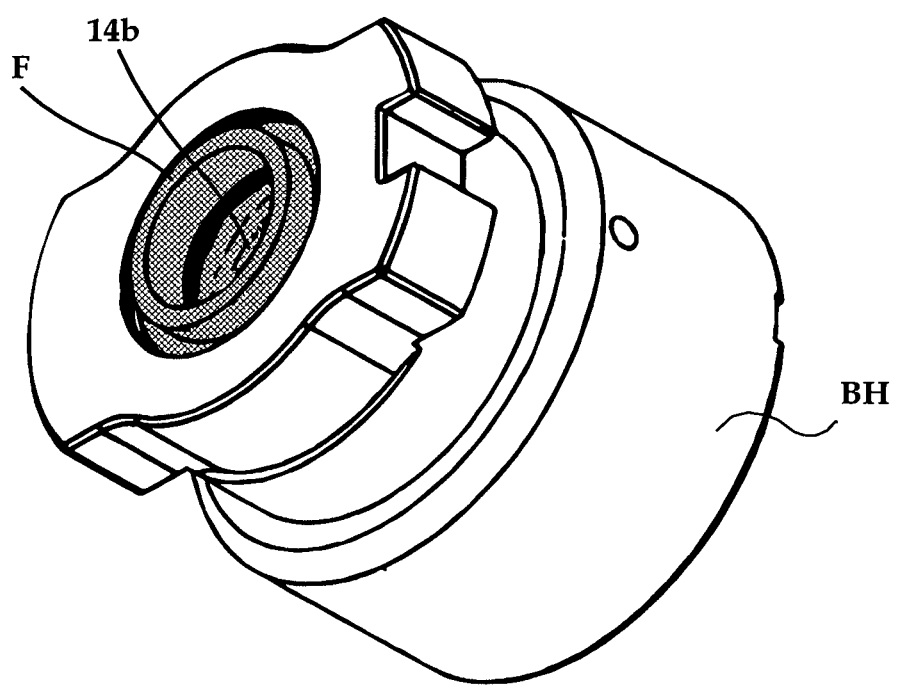
FIG. 28 shows a perspective view of a blow head according to the present invention comprising at least an air channel with a particle filter wrongly placed in said air channel according to FIG. 27.

FIG. 28 shows a perspective view of a blow head BH according to the present invention comprising at least an air channel 14b with a particle filter F wrongly placed in said air channel 14b according to FIG. 27.

Figure 29:
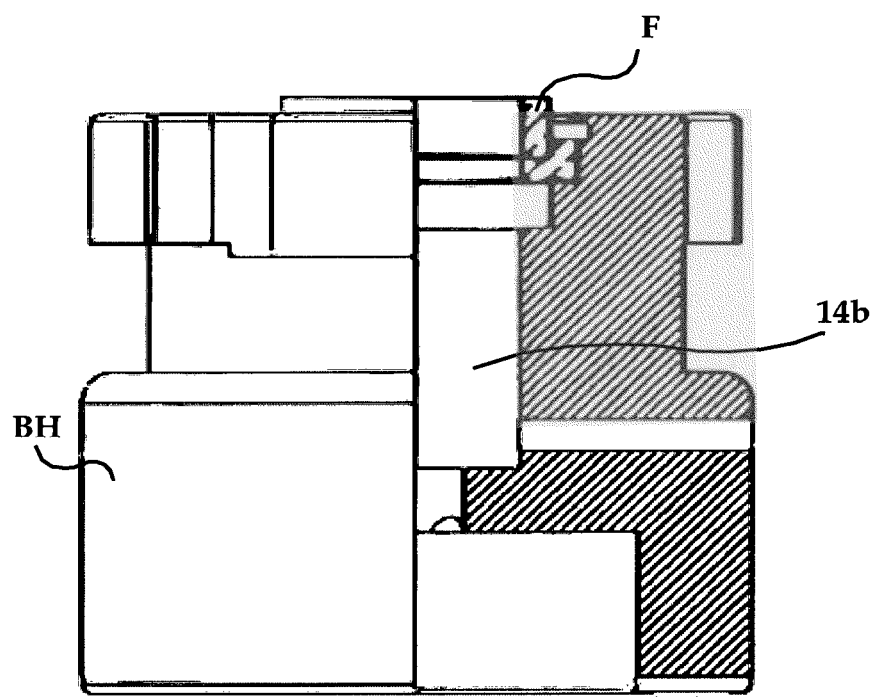
FIG. 29 shows a partly sectional view of blow head according to FIG. 27.

FIG. 29 shows a partly sectional view of a blow head BH partially opened according to FIG. 27.

Figure 30:
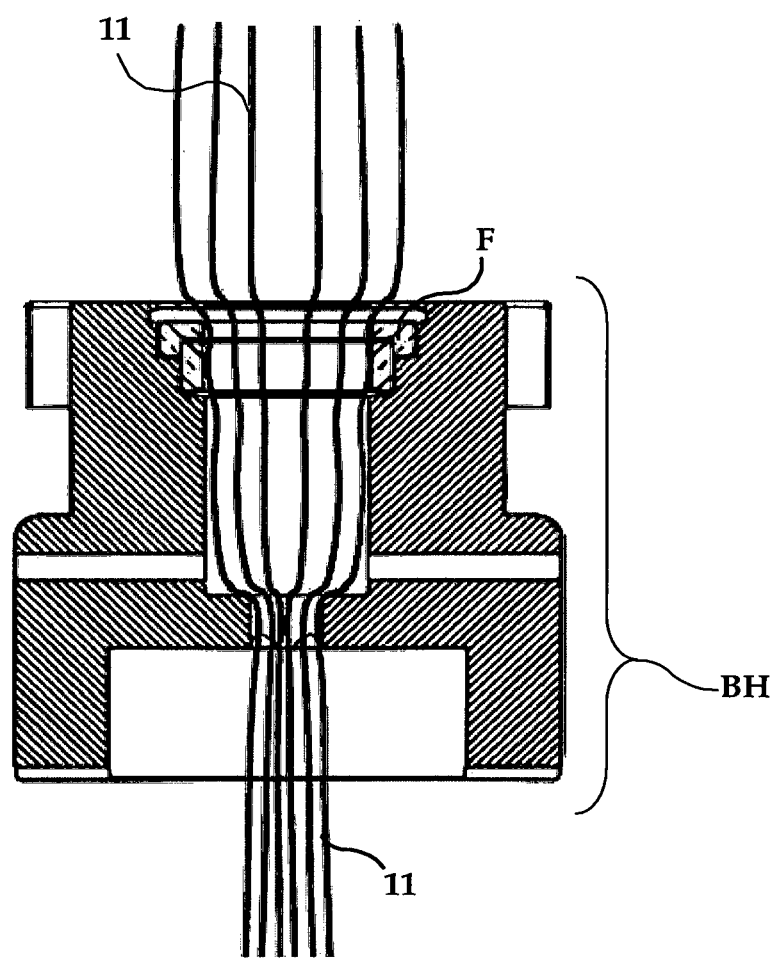
FIG. 30 shows a sectional view of the air flow of a final blow in a blow head according to the present invention.

FIG. 30 shows a sectional view of the air flow of a final blow 11 in a blow head BH according to the present invention. The pressurized air enters the blow head BH from upwards passing the particle filter F at the upper end of the air channel 14b that leads to the air inlet of the finish mold 8 through the pressurized air flows into the glass container's 12 inner space as final blow 11. By passing the particle filter F according to the present invention undesired particles will be separated and collected on the dirty side (here the upside) of said particle filter F.

Figure 31:
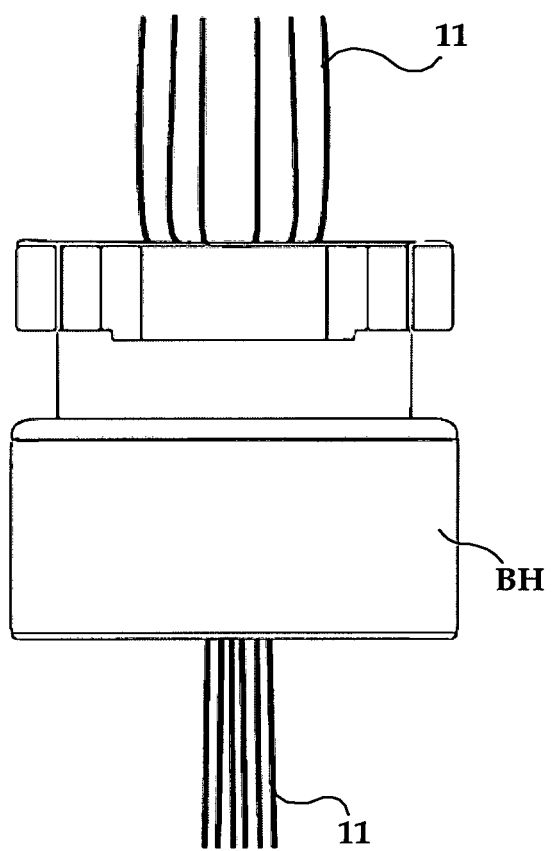
FIG. 31 shows a side view of the air flow of a final blow in a blow head according to FIG. 29.

FIG. 31 shows a side view of the air flow of a final blow 11 in a blow head BH according to FIG. 29.

Figure 32:
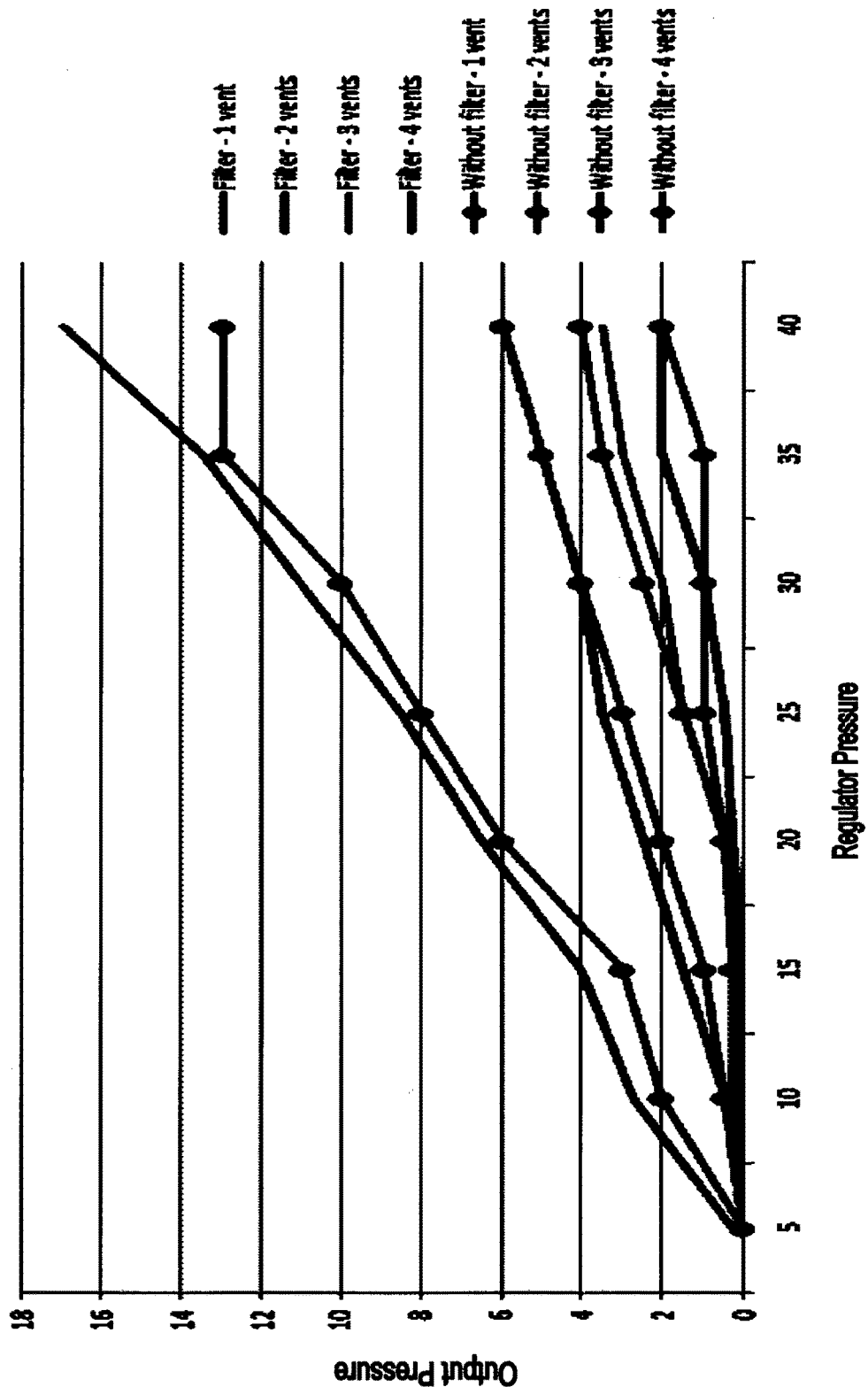
FIG. 32 shows a pressure drop chart from experiments with a main filter media with a maximum pore size of 110 micron (in the United States: US mesh 165)

FIG. 32 shows a pressure drop chart from experiments with a main filter media with a maximum pore size of 110 micron (in the United States: US mesh 165). Four experiments took place:

A $1^{st}$ experiment with 1 vent without the filter (upper line with dots placed on the line) and also 1 vent with the filter (upper line without dots), a $2^{nd}$ experiment with 2 vents without the filter (second line from the top with dots placed on the line) and also 2 vents with the filter (second line from the top without dots), a $3^{rd}$ experiment with 3 vents without the filter (second line from the bottom with dots placed on the line) and also 3 vents with the filter (second line from the bottom without dots), and a $4^{th}$ experiment with 4 vents without the filter (lower line with dots placed on the line) and also 4 vents with the filter (lower line without dots).

For each of the aforesaid experiments the x-axis of the pressure drop diagram of FIG. 32 shows the input pressure in psi (psi=pound force per square inch; psi could be converteted into Pascal [Pa] under the assumption of a gravitational constant of g=9.80665 ml s² and a US pound as lb=0.4536 kg as follows: 1 psi≈6 895 Pa and vice versa 1 Pa≈1.4504·10⁻⁴ psi) at the regulator and the y-axis the (resulting) output pressure in psi.

One can read from the pressure drop diagram shown here that there is no or no significant pressure drop using the main filter media with a maximum pore size of 110 micron (in the United States: US mesh 165).

Figure 33:
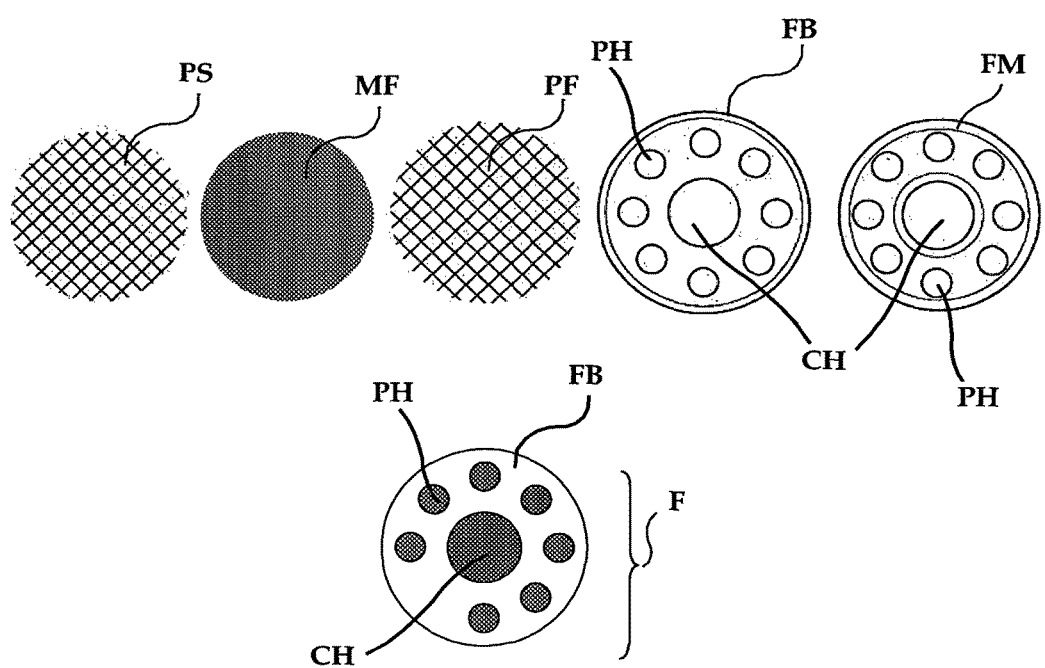
FIG. 33 shows in the upper row a set of four unmounted parts of another preferred embodiment of a particle filter according to the present invention with said parts as circular discs or disc like parts shown in an bird's eye view and below the upper row a preferred embodiment of a mounted particle filter according to the present invention shown also from an birds eye view perspective.

FIG. 33 shows in the upper row a set of four unmounted parts of another preferred embodiment of a particle filter F according to the present invention with said parts as circular discs or disc like parts PS, MF, PF, FB, FM shown in an bird's eye view on the surface of said discs or disc like parts PS, MF, PF, FB, FM, wherein a main filter media wire mesh disc MF that has to be positioned between a protective filter media wire mesh disc PF and a support mean wire mesh disc PS should be held together with said protective filter media wire mesh disc PF and said support mean wire mesh disc PS by a filter body ring FB and a fastening mean, here a press ring FM, if the press ring FM is inserted into said filter body ring FB with interference fit to said filter body ring FB.

Below the upper row a mounted preferred particle filter F according to the present invention is shown also from an birds eye view perspective.

The particle filter F according to the present invention as shown here is of—preferably larger—size that covers not only the air channel 14b for final blow 11 of the glass container 12, but also one or more finish cooling channel(s) 20 of a blow head BH for a finish cooling air flow 21 as for example shown in FIG. 4. The compressed air flows through a central hole CH in the filter body ring FB of the particle filter F for the final blow 11 as well as a respective hole CH in the the press ring FM of the particle filter F and for the finish cooling 21 through (a) peripheral hole(s) PH as well as (a) respective hole(s) PH in the the press ring FM of the particle filter F.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A particle filter for a glass forming machine operating according to a blow-and-blow process or according to a press-and-blow process, said particle filter is adapted for placing in at least an air channel serving pressurized air for counter blow of a parison in a blank mold forming station of said glass forming machine, and/or an air channel serving pressurized air for final blow and/or for finish cooling of a glass container made of said parison in a finish mold station of said glass forming machine, said particle filter comprising:

a surface filter as a main filter media that prevents passage of particles above a certain size from a dirty side of said main filter media to a clean side of said main filter media and that also prevents final passage of said particles above said certain size into said parison or said glass container blown by said glass forming machine;

an additional surface filter as a protective filter media more coarse than said main filter media and wherein said protective filter media is situated on said dirty side of said main filter media in order to protect said main filter media against impact of particles; and a porous support that is more coarse than said main filter media and is situated on said clean side of said main filter media to stabilize said main filter media against forces arising from particles arriving on said dirty side of said main filter media;

wherein said main filter media is situated between said protective filter media and said porous support; and wherein said main filter media that is situated between said protective filter media and said porous support is held together with said protective filter media and said porous support by a filter body and a fastening that is inserted into said filter body with interference fit to said filter body or screwed together with said filter body; and wherein said particle filter is adapted for placing in at least said air channel due to its geometry wherein the outer dimension of said filter body overlaps the outer dimension of said fastening.

2. The particle filter for a glass forming machine according to claim 1, wherein said particle filter is adapted for placing in at least:

said air channel situated in a plunger unit and serving pressurized air for counter blow of said parison in said blank mold forming station of said glass forming machine and said plunger unit situated in a plunger cylinder underneath said blank mold forming station of said glass forming machine, and/or said air channel situated in a blow head and serving pressurized air for final blow and/or for finish cooling of said glass container made of said parison in said finish mold station and said blow head situated above said finish mold station of said glass forming machine, and/or said air channel situated in a blow head support for supply of said blow head with pressurized air for final blow and/or for finish cooling of said glass container made of said parison in said finish mold station and for support of said blow head and said blow head support situated above said blow head that is situated itself above said finish mold station of said glass forming machine, and wherein said particle filter is adapted to be placed in at least:

said air channel situated in said plunger unit and serving pressurized air for counter blow of said parison in said blank mold forming station of said glass forming machine and air plunger unit situated in said plunger cylinder underneath said blank mold forming station of said glass forming machine, and/or said air channel situated in said blow head and serving pressurized air for final blow and/or for finish cooling of said glass container made of said parison in said finish mold station and said blow head situated above said finish mold station of said glass forming machine, and/or said air channel situated in said blow head support for supply of said blow head with pressurized air for final blow and/or for finish cooling of said glass container made of said parison in said finish mold station and for support of said blow head and said blow head support situated above said blow head that is situated itself above said finish mold station of said glass forming machine, to prevent the passage of said particles above said certain size from said dirty side of said main filter media to said clean side of said main filter media and thus also avoids the final passage of said particles into said parison or said glass container blown by said glass forming machine.

3. The particle filter for a glass forming machine according to claim 2, wherein said glass forming machine operating according to said blow-and-blow process or to said press-and-blow process is of an I.S. glass forming machine type.

4. The particle filter for a glass forming machine according to claim 1, wherein said glass forming machine operating according to said blow-and-blow process or to said press-and-blow process is of an I.S. glass forming machine type.

5. The particle filter for a glass forming machine according to claim 1, wherein said main filter media comprises a slotted filter.

6. The particle filter for a glass forming machine according to claim 5, wherein said slotted filter comprises a silicon substrate covered by a layer of silicon nitride.

7. The particle filter for a glass forming machine according to claim 1, wherein said main filter media comprises a sieve filter.

8. The particle filter for a glass forming machine according to claim 7, wherein said sieve filter comprises a silicon substrate covered by a layer of silicon nitride.

9. The particle filter for a glass forming machine according to claim 7, wherein said sieve filter of said main filter media comprises a wire mesh made of anti-corrosive material.

10. The particle filter for a glass forming machine according to claim 9, wherein said anti-corrosive material of said sieve filter of said main filter media is stainless steel.

11. The particle filter for a glass forming machine according to claim 9, wherein said mesh of said sieve filter of said main filter media is made of an anti-corrosive metal or metal alloy and is also passivated by electropolishing.

12. The particle filter for a glass forming machine according to claim 9, wherein said main filter media has a maximum pore size of 100 micron (US mesh 160).

13. The particle filter for a glass forming machine according to claim 12, wherein said main filter media has a pore size of 100 micron (US mesh 160).

14. The particle filter for a glass forming machine according to claim 12, wherein said main filter media has a maximum pore size of 40 micron (US mesh 325).

15. The particle filter for a glass forming machine according to claim 14, wherein said main filter media has a pore size of 40 micron (US mesh 325).

16. The particle filter for a glass forming machine according to claim 14, wherein said main filter media has a maximum pore size of 25 micron (US mesh 500).

17. The particle filter for a glass forming machine according to claim 16, wherein said main filter media has a pore size of 25 micron (US mesh 500).

18. The particle fitler for a glass forming machine according to claim 9, wherein the anti-corrosive material is an anti-corrosive metal or metal alloy with a minimum yield strength of 200 N/mm$^2$.

19. The particle fitler for a glass forming machine according to claim 9, wherein the anti-corrosive material is an anti-corrosive metal or metal alloy with a minimum yield strength of 350 N/mm$^2$.

20. The particle fitler for a glass forming machine according to claim 9, wherein the anti-corrosive material is an anti-corrosive metal or metal alloy with a minimum yield strength of 450 N/mm$^2$.

21. The particle filter for a glass forming machine according to claim 1, wherein said protective filter media comprises a wire mesh made of anti-corrosive material.

22. The particle filter for a glass forming machine according to claim 21, wherein said anti-corrosive material of said wire mesh of said protective filter media is stainless steel.

23. The particle filter for a glass forming machine according to claim 21, wherein said mesh of said protective filter media is made of an anti-corrosive metal or metal alloy and is also passivated by electropolishing.

24. The particle fitler for a glass forming machine according to claim 21, wherein the anti-corrosive material is an anti-corrosive metal or metal alloy with a minimum yield strength of 200 N/mm$^2$.

25. The particle fitler for a glass forming machine according to claim 21, wherein the anti-corrosive material is an anti-corrosive metal or metal alloy with a minimum yield strength of 350 N/mm$^2$.

26. The particle fitler for a glass forming machine according to claim 21, wherein the anti-corrosive material is an anti-corrosive metal or metal alloy with a minimum yield strength of 450 N/mm$^2$.

27. The particle fitler for a glass forming machine according to claim 21, wherein a mesh wire diameter of the wire mesh is thicker than a mesh wire diameter of said main filter media.

28. The particle filter for a glass forming machine according to claim 1, wherein said porous support comprises a wire mesh that is more coarse than said main filter media itself.

29. The particle filter for a glass forming machine according to claim 28, wherein said porous support comprises a wire mesh made of anti-corrosive material.

30. The particle filter for a glass forming machine according to claim 29, wherein said anti-corrosive material of said mesh of said porous support is stainless steel.

31. The particle filter for a glass forming machine according to claim 29, wherein said mesh of said porous support is made of an anti-corrosive metal or metal alloy and is also passivated, by electropolishing.

32. The particle fitler for a glass forming machine according to claim 29, wherein the anti-corrosive material is an anti-corrosive metal or metal alloy with a minimum yield strength of 200 N/mm$^2$.

33. The particle fitler for a glass forming machine according to claim 29, wherein the anti-corrosive material is an anti-corrosive metal or metal alloy with a minimum yield strength of 350 N/mm$^2$.

34. The particle filter for a glass forming machine according to claim 29, wherein the anti-corrosive material is an anti-corrosive metal or metal alloy with a minimum yield strength of 450 N/mm².

35. The particle filter for a glass forming machine according to claim 1, wherein said filter body and said fastening is made of an anti-corrosive material.

36. The particle filter for a glass forming machine according to claim 35, wherein said anti-corrosive material of said filter body and said fastening is made of stainless steel.

37. The particle filter for a glass forming machine according to claim 35, wherein said anti-corrosive material of said filter body and said fastening is made of an anti-corrosive metal and is also passivated by electropolishing.

38. The particle filter for a glass forming machine according to claim 35, wherein the anti-corrosive material is an anti-corrosive metal or metal alloy with a minimum yield strength of 200 N/mm².

39. The particle filter for a glass forming machine according to claim 35, wherein the anti-corrosive material is an anti-corrosive metal or metal alloy with a minimum yield strength of 350 N/mm².

40. The particle filter for a glass forming machine according to claim 35, wherein the anti-corrosive material is an anti-corrosive metal or metal alloy with a minimum yield strength of 450 N/mm².

41. The particle filter for a glass forming machine according to claim 1, wherein said main filter media and said protective filter media and said porous support are each a circular disc and wherein said filter body is a filter body ring and said fastening is a fastening ring that is inserted into said filter body ring with cylindrical interference fit to said filter body ring or screwed together with said filter body ring and wherein the outer diameter of said filter body ring overlaps the outer diameter of said press ring.

42. A plunger unit comprising at least an air channel for counter blow of a parison and said plunger unit being adapted to be positioned in a plunger cylinder underneath a blank mold forming station of a glass forming machine of a blow-and-blow process-type, wherein said air channel of said plunger unit is adapted to receive a particle filter according to claim 1 and said plunger unit air channel is adapted to said particle filter in such a way that said particle filter can properly be placed in said plunger unit air channel only in a position, in which said particle filter's main filter media's dirty side is situated on the incoming air side of said plunger unit air channel and wherein said particle filter is placed in at least said air channel of said plunger unit adapted to said particle filter.

43. The plunger unit according to claim 42, wherein said plunger unit air channel is adapted to said particle filter in such a way that said particle filter projects beyond said plunger unit if improperly placed in said plunger unit air channel.

44. The plunger unit according to claim 42, wherein said particle filter is secured in said plunger unit air channel by a safety ring that fits into a slot of said plunger unit air channel.

45. The plunger unit according to claim 44, wherein the safety ring is a Seegering™.

46. The glass forming machine according to claim 42, wherein the glass forming machine of a blow-and-blow process-type is an I.S. glass machine.

47. A blow head comprising at least an air channel for final blow and/or for finish cooling of a glass container made of a parison and said blow head being adapted to be positioned above a finish mold station of a glass forming machine of a blow-and-blow process-type or a press-and-blow process-type, wherein said air channel of said blow head is adapted to receive a particle filter according to claim 1 and said blow head air channel is adapted to said particle filter in such a way that said particle filter can properly be placed in said blow head air channel only in a position, in which said particle filter's main filter media's dirty side is situated on the incoming air side of said blow head air channel and where said particle filter is placed in at least said air channel of said blow head adapted to said particle filter.

48. The blow head according to claim 47, wherein said blow head air channel is adapted to said particle filter in such a way that said particle filter projects beyond said blow head if improperly placed in said blow head air channel.

49. The blow head according to claim 47, wherein said particle filter is secured in said blow head air channel by a safety ring that fits into a slot of said blow head air channel.

50. The glass forming machine according to claim 49, wherein the safety ring is a Seegering™.

51. The glass forming machine according to claim 47, wherein the glass forming machine of a blow-and-blow process-type or a press-and-blow process-type is an I.S. glass machine.

52. A blow head support for support of a blow head comprising at least an air channel for supply of said blow head with pressurized air and said blow head support being adapted to be positioned above said blow head which itself is adapted to be positioned above a finish mold station of a glass forming machine of a blow-and-blow process-type or a press-and-blow process-type, wherein said air channel of said blow head support is adapted to receive a particle filter according to claim 1 and said blow head support air channel is adapted to said particle filter in such a way that said particle filter can properly be placed in said blow head support air channel only in a position, in which said particle filter's main filter media's dirty side is situated on the incoming air side of said blow head support air channel and wherein said particle filter is placed in at least said air channel of said blow head support adapted to receive said particle filter.

53. The blow head support according to claim 52, wherein said blow head support air channel is adapted to said particle filter in such a way that said particle filter projects beyond said blow head support if improperly placed in said blow head support air channel.

54. The blow head support according to claim 52, wherein said particle filter is secured in said blow head support air channel by a safety ring that fits into a slot of said blow head support air channel.

55. The glass forming machine according to claim 54, wherein the safety ring is a Seegering™.

56. The glass forming machine according to claim 52, wherein the glass forming machine of a blow-and-blow process-type or a press-and-blow process-type is an I.S. glass machine.

57. A glass forming machine of a blow-and-blow process-type or a press-and-blow process-type, said glass forming machine adapted to receive at least one particle filter according to claim 1 and wherein said glass forming machine comprises an air channel serving pressurized air for counter blow of a parison in a blank mold forming station of said glass forming machine and/or an air channel serving pressurized air for final blow and/or for finish cooling of a glass container made of said parison in a finish mold station of said glass forming machine and said air channel of said glass forming machine is adapted to receive said particle filter and said glass forming machine air channel is adapted to said particle filter in such a way that said particle filter can properly be placed in said glass forming machine air channel only in a position, in which said particle filter's main filter media's dirty side is situated on the incoming air side of said air channel and wherein said particle filter is placed in at least said air channel of said glass forming machine adapted to receive said particle filter.

58. The glass forming machine according to claim 57, wherein said particle filter is secured in said glass forming machine air channel by a safety ring that fits into a slot of said glass forming machine air channel.

59. The glass forming machine according to claim 58, wherein the safety ring is a Seegering™.

60. The glass forming machine according to claim 57, wherein said glass forming machine comprises a plunger unit comprising at least an air channel for counter blow of the parison and said plunger unit being adapted to be positioned in a plunger cylinder underneath the blank mold forming station of the glass forming machine, wherein said air channel of said plunger unit is adapted to receive said particle filter and said plunger unit air channel is adapted to said particle filter in such a way that said particle filter can properly be placed in said plunger unit air channel only in a position, in which said particle filter's main filter media's dirty side is situated on the incoming air side of said plunger unit air channel and wherein said particle filter is placed in at least said air channel of said plunger unit adapted to said particle filter.

61. The glass forming machine according to claim 57, wherein said glass forming machine comprises a blow head comprising at least an air channel for final blow and/or for finish cooling of the glass container made of the parison and said blow head being adapted to be positioned above the finish mold station of the glass forming machine, wherein said air channel of said blow head is adapted to receive said particle filter and said blow head air channel is adapted to said particle filter in such a way that said particle filter can properly be placed in said blow head air channel only in a position, in which said particle filter's main filter media's dirty side is situated on the incoming air side of said blow head air channel and where said particle filter is placed in at least said air channel of said blow head adapted to said particle filter; and/or a blow head support for supporting the blow head comprising at least an air channel for supplying said blow head with pressurized air and said blow head support being adapted to be positioned above said blow head which itself is adapted to be positioned above the finish mold station of the glass forming machine, wherein said air channel of said blow head support is adapted to receive said particle filter and said blow head support air channel is adapted to said particle filter in such a way that said particle filter can properly be placed in said blow head support air channel only in a position, in which said particle filter's main filter media's dirty side is situated on the incoming air side of said blow head support air channel and wherein said particle filter is placed in at least said air channel of said blow head support adapted to receive said particle filter.

62. The glass forming machine according to claim 57, wherein said glass forming machine of said blow-and-blow process-type or said press-and-blow process-type is an I.S. glass forming machine.

* * * * *